(12) United States Patent
Atkinson et al.

(10) Patent No.: US 7,225,152 B2
(45) Date of Patent: May 29, 2007

(54) METHOD, APPARATUS, AND SYSTEM FOR VARYING AN AWARD VOLUME IN AN AUCTION

(75) Inventors: Scott W. Atkinson, Pittsburgh, PA (US); Boaz Maor, Palo Alto, CA (US); Sam E. Kinney, Jr., Sewickley, PA (US); Tao. Wang, Fremont, CA (US)

(73) Assignee: Ariba, Inc., Sunnyvale, CA (US)

( * ) Notice: Subject to any disclaimer, the term of this patent is extended or adjusted under 35 U.S.C. 154(b) by 1395 days.

(21) Appl. No.: 09/753,073

(22) Filed: Dec. 29, 2000

(65) Prior Publication Data

US 2001/0039528 A1 Nov. 8, 2001

Related U.S. Application Data

(63) Continuation-in-part of application No. 09/252,790, filed on Feb. 19, 1999, now Pat. No. 6,230,146, and a continuation-in-part of application No. 09/490,877, filed on Jan. 24, 2000, now Pat. No. 6,871,191.

(51) Int. Cl.
G06Q 40/00 (2006.01)
(52) U.S. Cl. ...................................................... 705/37
(58) Field of Classification Search .................. 705/37
See application file for complete search history.

(56) References Cited

U.S. PATENT DOCUMENTS 3,581,072 A 5/1971 Nymeyer (Continued)

FOREIGN PATENT DOCUMENTS

EP 0399850 A 11/1990

(Continued)

OTHER PUBLICATIONS

"BroadVision Developing First Interactive Commerce Management System To Support Online Sales & Marketing Process; New Software Category Necessary to Interactive Network Architecture", Business Wire, p. 5150152, May 15, 1995.

(Continued)

*Primary Examiner*—Elisca Pierre Eddy
(74) *Attorney, Agent, or Firm*—Van Pelt, Yi & James LLP

(57) ABSTRACT

A method of allocating an award in an auction wherein an award for a given auction round is allocated amongst a plurality of highest ranked bidders including at least a first ranked bidder and a second ranked bidder is disclosed. The method provides an incentive to the first ranked bidder and the second ranked bidder to each improve their respective bids during the conducting of the auction. The method includes adopting a formula for allocating the award amongst at least the first ranked bidder and the second ranked bidder, conducting the electronic auction, and allocating the award between at least the first and second ranked bidders in accordance with the formula and the bids of the first and second ranked bidders. A factor of the formula is an actual bid differential between a bid of the first ranked bidder and a bid of the second ranked bidder. Furthermore, application of the formula to bids of the first and second ranked bidders causes a first portion of the award allocated to the first ranked bidder to increase, and a second portion of the award allocated to the second ranked bidder to decrease as a magnitude of the actual bid differential increases.

35 Claims, 8 Drawing Sheets

U.S. PATENT DOCUMENTS

| | | | |
|---|---|---|---|
| 3,863,060 | A | 1/1975 | Rode et al. |
| 4,597,045 | A | 6/1986 | Kiuchi |
| 4,674,044 | A | 6/1987 | Kalmus et al. |
| 4,789,928 | A | 12/1988 | Fujisaki |
| 4,799,156 | A | 1/1989 | Shavit et al. |
| 4,845,625 | A | 7/1989 | Stannard |
| 4,992,940 | A | 2/1991 | Dworkin |
| 5,136,501 | A | 8/1992 | Silverman et al. |
| 5,193,056 | A | 3/1993 | Boes |
| 5,243,515 | A | 9/1993 | Lee |
| 5,297,032 | A | 3/1994 | Trojan et al. |
| 5,375,055 | A | 12/1994 | Togher et al. |
| 5,394,324 | A | 2/1995 | Clearwater |
| 5,402,336 | A | 3/1995 | Spiegelhoff et al. |
| 5,606,602 | A | 2/1997 | Johnson et al. |
| 5,629,982 | A | 5/1997 | Micali |
| 5,640,569 | A | 6/1997 | Miller et al. |
| 5,664,115 | A | 9/1997 | Fraser |
| 5,684,963 | A | 11/1997 | Clement |
| 5,689,652 | A | 11/1997 | Lupien et al. |
| 5,715,402 | A | 2/1998 | Popolo |
| 5,727,165 | A | 3/1998 | Ordish et al. |
| 5,758,327 | A | 5/1998 | Gardner et al. |
| 5,758,328 | A | 5/1998 | Giovannoli |
| 5,765,138 | A | 6/1998 | Aycock et al. |
| 5,774,873 | A | 6/1998 | Berent et al. |
| 5,794,207 | A | 8/1998 | Walker et al. |
| 5,794,219 | A | 8/1998 | Brown |
| 5,797,127 | A | 8/1998 | Walker et al. |
| 5,799,151 | A | 8/1998 | Hoffer |
| 5,799,285 | A | 8/1998 | Klingman |
| 5,802,502 | A | 9/1998 | Gell et al. |
| 5,803,500 | A | 9/1998 | Mossberg |
| 5,809,483 | A | 9/1998 | Broka et al. |
| 5,826,244 | A | 10/1998 | Huberman |
| 5,832,496 | A | 11/1998 | Anand et al. |
| 5,835,896 | A | 11/1998 | Fisher et al. |
| 5,862,223 | A | 1/1999 | Walker et al. |
| 5,890,138 | A | 3/1999 | Godin et al. |
| 5,897,621 | A | 4/1999 | Boesch et al. |
| 5,905,974 | A | 5/1999 | Fraser et al. |
| 5,905,975 | A | 5/1999 | Ausubel |
| 5,915,209 | A | 6/1999 | Lawrence |
| 5,966,699 | A | 10/1999 | Zandi |
| 6,012,045 | A * | 1/2000 | Barzilai et al. ............... 705/37 |
| 6,014,627 | A | 1/2000 | Togher et al. |
| 6,021,398 | A | 2/2000 | Ausubel |
| 6,023,685 | A | 2/2000 | Brett et al. |
| 6,044,363 | A | 3/2000 | Mori et al. |
| 6,055,518 | A | 4/2000 | Franklin et al. |
| 6,058,379 | A | 5/2000 | Odom et al. |
| 6,061,663 | A | 5/2000 | Bloom et al. |
| 6,078,906 | A | 6/2000 | Huberman |
| 6,119,229 | A | 9/2000 | Martinez et al. |
| 6,151,589 | A | 11/2000 | Aggarwal et al. |
| 6,161,099 | A | 12/2000 | Harrington et al. |
| 6,199,050 | B1 | 3/2001 | Alaia et al. |
| 6,266,652 | B1 | 7/2001 | Godin et al. |

FOREIGN PATENT DOCUMENTS

| | | | |
|---|---|---|---|
| JP | 409101994 A | | 4/1997 |
| JP | 410078992 A | | 3/1998 |
| JP | 2002123706 A | * | 4/2002 |
| WO | WO 92/15174 | | 9/1992 |
| WO | WO 97/37315 | | 10/1997 |
| WO | WO 98/34187 | | 8/1998 |
| WO | WO 99/63461 | | 12/1999 |

OTHER PUBLICATIONS

"FairMarket Launches New Self-Serve Auctions." Business Wire, p. 6161495, Jun. 16, 1998.

Lee, "Do electronic marketplaces lower the price of goods?", Communications of the PCM, v41n1 pp. 73-80 Jan. 1998.

"Moai Technologies Introduces New categories of Business to Business Auction Software..", Business Editors and Computer writers, Mar. 16, 1998.

Kikuchi et al., "Multi-Round Anonymous Auction Protocols", IEICE Trans. Inf. & Syst., vol. E82-D, No. 4, Apr. 1999.

"Online bidding software", Electronic Buyers' News, Aug. 25, 1997 Issue 1072, p. 86, 1/6p.

"Sold!. . . To the Lowest Bidder", Computer Finance, v6, n2 Jul. 1995.

"Venture Capitalists Fund Two Massachusetts Internet Related Companies", Boston Globe, Jan. 14, 1998.

Vigoroso, "Buyers prepare for brave new world of e-commerce." Purchasing, v126, n6, p. S4(1), Apr. 22, 1999.

Von der Fehr et al., "Predatory bidding in sequential auctions", Oxford Economics Papers, v46, n3, p. 345(12) Jul. 1994.

"What you need to know to bid in FCC's narrowband auction" Washington Telecom News, v2, n26, p. 6(2), Jun. 27, 1994.

Malone et al., "The Logic of Electronic Markets", *Harvard Business Review*, No. 893II (May-Jun. 1989).

Freemarkets™ Online, "Bidware Manual" (Jun. 9, 1988).

Freemarkets Online™, "Online Industrial Market Making, An Overview of Purchasing Executives".

WebAuction.com, "How to Play" (1998).

Auction Sales, "Live Auctions Online" (Sep. 1998).

Auction Port, "Online Auction Community—New Auctions Since Sep. 2, 1998" (Jul. 1998).

OnSale, "How to Play" (1998).

u-Auction-It™ (1997).

Freemarkets Online™, "Homepage" (1998).

Andrews, "Auctions Catch the Interest of Hobbyists and Big Business", Aug. 24, 1998.

Associated Press, "Auction on Web is Buyer's Market", Apr. 6, 1998.

Steinert-Threlkeld, "The Watchwords: Let Sellers Beware", Jun. 1, 1998.

Woolley, "E-muscle", Mar. 9, 1998.

Associated Press, "FreeMarkets Takes Auction on Internet", Feb. 23, 1998.

Jahnke, "How Bazaar" (Aug. 27, 1998).

Wilder, "What's Your Bid?—FreeMarkets' real-time online bidding technology lets clients drive down costs and improve product value", Nov. 10, 1997, *InformationWeek*.

Jean-Pierre Banatre, et al., "The Design and Building of Enchere, a Distributed Electronic Marketing System" Communications of the ACM, No. 1 (Jan. 29, 1986).

Danny Cohen, "Computerized Commerce" Information Processing 89 (Aug. 28-Sep. 1, 1989).

\* cited by examiner

FIG. 4  AUCTION NETWORK

METHOD, APPARATUS, AND SYSTEM FOR VARYING AN AWARD VOLUME IN AN AUCTION

CROSS-REFERENCE TO RELATED APPLICATIONS

The present application is a continuation-in-part of U.S. patent application Ser. No. 09/252, 790, filed Feb. 19, 1999, and U.S. patent application Ser. No. 09/490, 877, filed Jan. 24, 2000, both of which are currently pending and assigned to the assignee of the present invention.

BACKGROUND OF THE INVENTION

1. Field of the Invention

The disclosed invention relates generally to awarding a variable volume to one or more bidders in an auction, and in particular, to basing the volume allotted to a bidder on the differential amount bid by at least two bidders.

2. Description of the Background

Procurement of goods and services have traditionally involved high transaction costs. The cost of finding and qualifying potential bidders has been particularly high. The advent of electronic commerce has introduced new methods of procurement that lower some of the transaction costs associated with procurement. Electronic procurement, in particular business-to-business electronic procurement, matches buyers and suppliers and facilitates transactions that take place on networked processors.

Four models of electronic procurement have been developed: catalog, buyer-bidding auctions, seller-bidding auctions, and exchange marketplaces.

The "catalog" model was an early form of online electronic procurement. Initially, electronic catalogs were developed primarily by sellers, typically suppliers, to help customers obtain information about products, and order supplies electronically. Those first electronic catalogs were single-source; i.e. they only allowed customers to obtain information and products from that supplier.

Although the first electronic catalogs reduced the information search cost associated with procurement, customers were disadvantageously "locked in" to one supplier at each electronic catalog. Customers were thus unable to compare a number of competing products in a single catalog. Therefore, certain suppliers with single-source catalogs began including competitors' products in their systems. The inclusion of competing products in electronic catalogs reduced procurement information search costs even further. By offering competing products, electronic catalogs became "electronic markets."

Many electronic catalogs, however, were biased toward the supplier offering the electronic catalog, and it was thought that procurement costs could be lowered further through an unbiased market. Therefore, third-party "market makers" developed markets for many standard products and services, which were intended to be unbiased markets.

Electronic commerce using the electronic catalog model typically involves one buyer and one seller at a time. When many buyers compete for the right to buy from one seller, a buyer-bidding auction model, or forward auction, is created. Catalog and buyer-bidding auction models, however, have limitations and do not work well in every situation. For example, it is difficult for a supplier to publish set prices in a catalog for custom products. Therefore, when a buyer requires a custom product, pricing for that product typically will not be found in a catalog. Likewise, it is difficult to specify a custom product and identify buyers who might use that custom product for a buyer-bidding auction. Additionally, there may be only one buyer interested in a custom product, such that a buyer-bidding auction may not be applicable in all cases. Thus, few suppliers can typically provide custom goods and services and standard product and pricing information is typically not available for buyers of custom industrial products.

Referring again to the cost of traditional procurement, and particularly procurement of custom products and services, when a company required a custom product, a buyer for the company would typically procure the product by searching for potential suppliers and then acquire price quotes from the potential suppliers for the needed custom product. The search tended to be slow and random, and typically relied heavily on personal relationships. The costs associated with locating vendors, comparing prices, and negotiating a deal were therefore large. The cost of switching suppliers was also large, such that an incumbent supplier's quoted price was most likely not the lowest price he could offer because the incumbent supplier knew the buyer would face switching costs to use another supplier. As an additional consequence, new suppliers had a difficult time entering the market because of those high switching costs.

Therefore, supplier-bidding auctions for products and services defined by a buyer have been developed. The assignee of the present application has developed a system in which sellers downwardly bid against one another to achieve the lowest market price in a supplier-bidding auction. In such auctions, various goods or services may simultaneously be placed for auction. In certain situations, however, it is desirable to award contracts to two or more bidders in a single auctions round.

Thus, there is a need for a system, apparatus and process whereby a sponsor may conduct an auction having multiple awards in a single auction round. Furthermore, when awarding multiple contracts in a single auction round, there is a need to provide a system, apparatus and process whereby bidders are provided with an incentive to improve their bids even though they are in a position to be awarded a contract in view of their current bids.

There is also a need for a system, a method, and an apparatus that allows a purchaser to purchase goods and/or services from more than one supplier in a single auction round. There is a need for a system, a method, and an apparatus that allows a purchaser to purchase a quantity of goods or service that is greater than the quantity that at least one bidding supplier is able to provide in a single auction round. Furthermore, there is a need for a system, a method, and an apparatus that allows a purchaser to vary the volume that it will purchase in an auction depending upon the bids received during that auction.

SUMMARY OF THE INVENTION

The present invention is directed to a system and method for conducting an electronic auction wherein an award for a given auction round is allocated amongst a plurality of highest ranked bidders, including, at least a first ranked bidder and a second ranked bidder. The invention provides an incentive to the first and second ranked bidders to each improve their respective bids during the conducting of the auction. The invention uses a formula for allocating the award amongst at least the first and second ranked bidders. The formula includes as a factor an actual bid differential between a bid for the first ranked bidder, and a bid of the second ranked bidder. Application of the formula to bids of the first and second ranked bidders causes a first portion of the award allocated to the first ranked bidder to increase and a second portion of the award allocated to the second ranked bidder to decrease as a magnitude of the actual bid differential increases. During and/or after the conducting of the auction, the award is allocated between at least the first and second ranked bidders in accordance with the formula and the bids of the first and second ranked bidders.

In accordance with one form of the present invention, there is provided a method, system, and apparatus for varying an allocated volume in an auction. In one embodiment, the method includes determining a range of volume to be allocated to the first bidder, formulating a formula based on the range of volume to be allocated to the first bidder and a differential bid range, and applying an actual differential between bids placed by a first bidder and a second bidder in an auction to the formula to determine the volume to be allocated to the first bidder. Any remaining volume to be awarded or allocated may then be allocated to one or more other bidders in the same auction. The method of the present invention can be applied to both reverse and forward auctions. In addition, the method is particularly applicable to online auctions where bidders submit bids to an auction coordinator electronically online during the auction process.

In accordance with another embodiment of the present invention, a system for varying an award volume in an auction is provided. The system includes a sponsor processor, a first bidder processor communicating with the sponsor processor, and a second bidder processor communicating with the sponsor processor. In the system, the sponsor processor contains instructions which, when executed by the processor, cause the processor to determine a range of volume to be awarded to a first bidder, formulate a formula based on the range of volume to be awarded to the first bidder and a differential bid range, and apply the formula to an actual differential between bids placed by the first bidder and a second bidder in an auction to determine the volume to be awarded to the first bidder.

A computer readable medium having instructions stored thereon is also disclosed. The instructions are such that when executed by a processor, the instructions cause the processor to determine a range of volume to be awarded to a first bidder, formulate a formula based on the range of volume to be awarded to the first bidder and a differential bid range, and apply the formula to an actual differential between bids placed by the first bidder and a second bidder in an auction to determine the volume to be awarded to the first bidder.

In accordance with yet a further embodiment, the present invention is directed to a bidding device operated by a bidder during an online auction. The bidding device could, for example, be a personal computer, workstation, or terminal used by the bidder during the auction. The bidding device includes software that enables the bidder to submit bids to a sponsor processor during an auction. The sponsor processor determines a range of volume to be awarded to the first bidder and applies an actual differential between bids placed by the first bidder and a second bidder in an auction to a formula based on the range of volume to be awarded to the first bidder and a differential bid range to determine the volume to be awarded to the first bidder. The bidder furthermore submits bids to the sponsor processor through the bidding device.

Thus, the present invention provides a method, apparatus, and system whereby a sponsor may conduct an auction having multiple awards in a single auction round. Also, the present invention provides a system, a method, and an apparatus by which an award volume in an auction may vary in accordance with a difference between bids placed. In addition, the present invention provides a system, a method, and an apparatus that allows a purchaser to purchase a quantity of goods or service that is greater than the quantity that at least one bidding supplier is able to provide. Furthermore, the present invention provides a system, a method, and an apparatus that affords an incentive for bidders to improve their bids even though they are in a position to be awarded a contract in view of their current bids. The present invention also provides a method, a system, and an apparatus that allows a purchaser to vary the volume that it will purchase in an auction depending upon the bids received during that auction.

Accordingly, the present invention provides solutions to the shortcomings of prior online auctions. Those of ordinary skill in the art will readily appreciate, therefore, that those and other details, features, and advantages will become further apparent in the following detailed description of the preferred embodiments.

BRIEF DESCRIPTION OF THE DRAWINGS

The accompanying drawings, wherein like reference numerals are employed to designate like parts or steps, are included to provide a further understanding of the invention, are incorporated in and constitute a part of this specification, and illustrate embodiments of the invention that together with the description serve to explain the principles of the invention.

In the drawings.

DETAILED DESCRIPTION

Figure 1A:
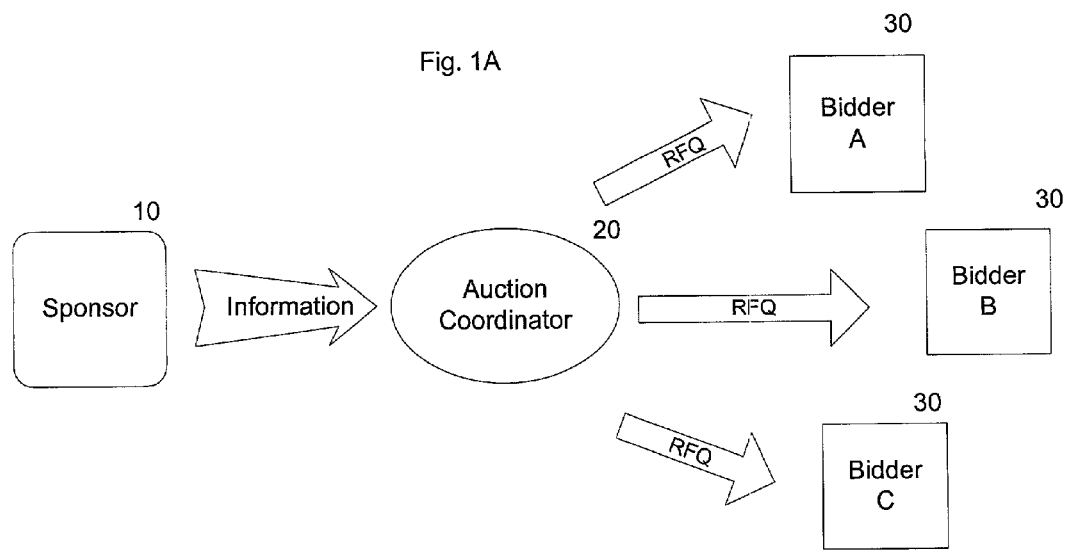
FIG. 1A is a schematic illustration of the entities involved in an embodiment of an auction wherein the sponsor identifies goods or services to be purchased in a request for quotation.

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical auction systems and computer networks. The present invention described below extends the operation of the inventive auction systems and methods described in greater detail in co-pending application Ser. No. 09/252,790, entitled "Method and System for Controlling Closing Times of Electronic Auctions Involving Multiple Lots" filed Feb. 19, 1999, and co-pending application Ser. No. 09/490,877, entitled "Method and System for Partial Quantity Evaluated Rank Bidding in Online Auctions" filed Jan. 24, 2000 the disclosures of which are hereby expressly incorporated in the present application.

In a supplier-bidding auction or reverse auction, bids, which are often in the form of a price quote, typically start high and move downward over time as bidders interact to establish a closing price. Typically, the auction marketplace is one-sided, with one buyer and many potential suppliers, although multiple-buyer auctions are possible. Typically, products are purchased in the form of components or materials. "Components" may include fabricated tangible pieces or parts that become parts of assemblies of durable products. Example components include gears, bearings, and appliance shelves. "Materials" may include bulk quantities of raw materials that are further transformed into products. Example materials include corn syrup and sheet steel. Services may also be purchased in such a reverse auction.

Industrial buyers do not typically purchase one component at a time. Rather, they tend to purchase whole families of similar components. Therefore, in a typical industrial supplier-bidding auction, products are grouped together in "lots" of related items for bidding. In a regular lot bidding auction, each lot is composed of several "line items." In the regular lot bidding auction, the suppliers bid on each line item and the bidder 30 having the best bid for all of the parts in the lot is the best bidder 30. The best bidder 30 is typically awarded a contract to supply the items in the lot. In an aggregate type lot bid, a single bid for all of the line items is submitted by each bidder 30 and the bidder 30 submitting the lowest aggregate price is the best bidder 30. By lotting products, potential suppliers can bid on lots for which they are best suited, and are not typically required to bid on every lot. Such a division into lots beneficially reduces the barrier to entry for new potential suppliers that only have capability to supply some of the needed products in the auction. Reducing the barrier to entry also benefits the purchaser by injecting additional bidders 30 into bidding for certain lots.

Typically, components in a lot are related to one another such that it is more efficient to have a supplier provide all of the components in that lot. As an example, a buyer might purchase a given plastic knob in two different colors, or might purchase a nameplate in four different languages. Those parts are so similar that it is nearly always more efficient to purchase those related components from the same supplier because, for example, all of the knobs may be made using with same mold. Thus, such related items are typically grouped in a single "lot." As is known by one skilled in the art, there are many additional methods of lotting products for an auction.

Figure 1B:
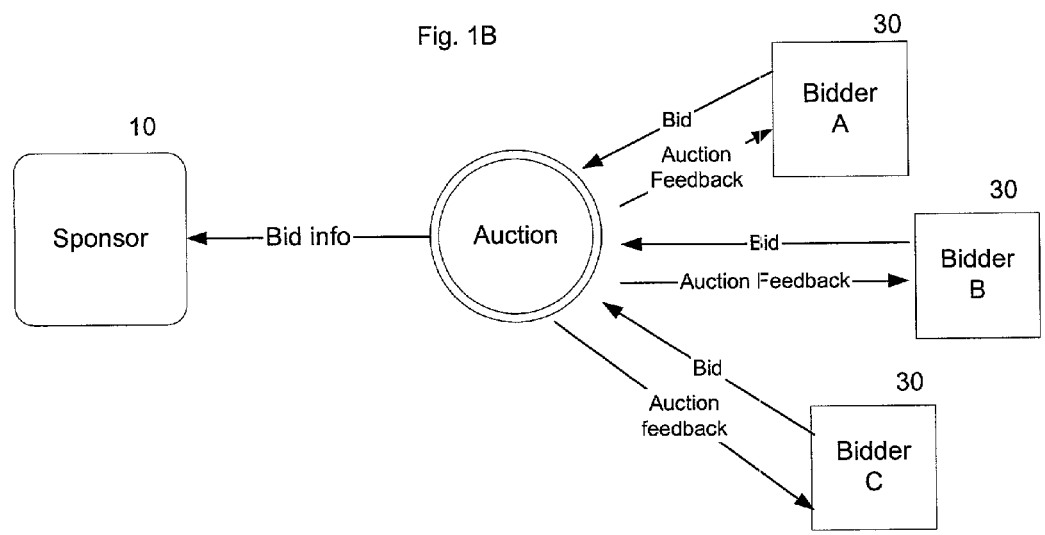
FIG. 1B is a schematic illustration of entities participating in an embodiment of an auction.
Figure 1C:
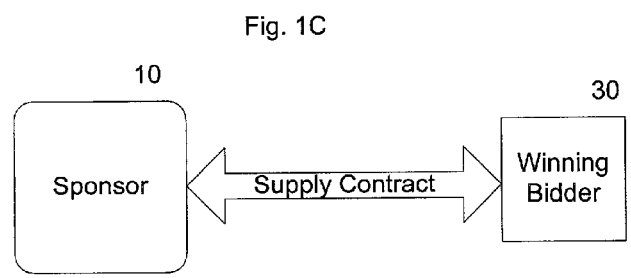
FIG. 1C is a schematic illustration of entities participating in an embodiment of a contract award following an auction.

The basic process for a purchaser sponsored supplier-bidding or reverse auction, as conducted by the assignee of the present invention, is described below with reference to FIG. 1. FIG. 1 illustrates the functional elements and entities involved in setting up and conducting a typical supplier-bidding auction. FIG. 1A illustrates the creation of an auctioning event, FIG. 1B illustrates the bidding during an auction, and FIG. 1C illustrates results after completion of a successful auction.

As will be apparent to one skilled in the art, while the invention is generally described in terms of one buyer and multiple suppliers, the present invention may also be used in other types of electronic markets, such as auctions having multiple potential buyers and sellers, forward auctions having a single seller and multiple potential purchasers, upward-bidding auctions, or electronic exchange marketplaces. The term "sponsor" will be utilized herein to identify the party or parties that originate the auction. In a forward auction, for example, the sponsor would typically be the supplier or seller of one or more goods or services. In such a forward auction, that sponsor might state a good that it desires to sell and receive bids from parties wishing to purchase that good. Those parties wishing to purchase that good would furthermore be "bidders" 30 in such a forward auction.

In a reverse auction example, the sponsor would typically be the purchaser or buyer of one or more goods or services. In such a reverse auction, that supplier might state a good that it desires to purchase and receive bids from parties wishing to supply that good. Those parties wishing to supply that good would furthermore be "bidders" 30 in such a reverse auction.

In the typical supplier-bidding reverse auction model, the product or service to be purchased is usually defined by the sponsor of the auction. As shown in FIG. 1A, when the sponsor 10 decides to use the auctioning system of the present invention to procure products or services, the sponsor 10 provides information to an auction coordinator 20. That information may include information about incumbent suppliers and historic prices paid for the products or services to be auctioned, for example. Typically, the sponsor 10 may also work with the auction coordinator 20 to define the products and services to be purchased in the auction and, if desired, lot the products and services appropriately so that needed products and services can be procured using optimal auction dynamics. A specification may then be prepared for each desired product or service, and a Request for Quotation ("RFQ") generated for the auction.

Next, the auction coordinator 20 typically identifies potential suppliers 30, preferably with input from the sponsor 10, and invites the potential suppliers 30 to participate in the upcoming auction. The suppliers 30 that are selected to participate in the auction become bidders 30 and may be given access to the RFQ, typically through an RFQ in a tangible form, such as on paper or in an electronic format.

As shown in FIG. 1B, during a typical auction, bids are made for lots. Bidders 30 may submit actual unit prices for all line items within a lot, however, the competition in an auction is typically based on the aggregate value bid for all line items within a lot. The aggregate value bid for a lot may, therefore, depend on the level and mix of line item bids and the quantity of goods or services that are offered for each line item. Thus, bidders 30 submitting bids at the line item level may actually be competing on the lot level. During the auction, the sponsor 10 can typically monitor the bidding as it occurs. Bidders 30 may also be given market feedback during the auction so that they may bid competitively.

Feedback, including bidder 30 identity, about bidding activity is referred to as "market feedback" and includes any information or data related to the bidders 30 or their bids, interrelationships between those bids, and any other bid related information or data that is received before or during the auction. Market feedback may include, for example, bids that have been placed by other bidders 30, the rank of a participants bid in relation to one or more other bidders 30, the identity of bidders 30, or any subset of that information.

Market feedback may also include non-pricing information such as, for example, the quality of the goods to be provided by bidders 30 and shipping costs associated with one or more bidders 30. Providing such market feedback to bidders 30 in an auction helps create real-time competitive interaction among participants in the auction because, without feedback, bidders 30 who are not leading in an auction might not be aware or their relative position and would have less incentive to revise their price quotes and place additional bids to remain competitive.

After the auction, the auction coordinator 20 may analyze the auction results with the sponsor 10. The sponsor 10 typically conducts final qualification of the low bidding supplier or suppliers 30. The sponsor 10 may furthermore retain the right not to award business to a low bidding supplier 30 based on final qualification or other business concerns. As shown in FIG. 1C, at least one supply contract is usually drawn up and executed based on the results of the auction.

The auction may be conducted electronically between bidders 30 at their respective remote sites and the auction coordinator 20 at its site. In an alternative embodiment, instead of the auction coordinator 20 managing the auction at its site, the sponsor 10 may perform auction coordinator tasks at its site.

Figure 2:
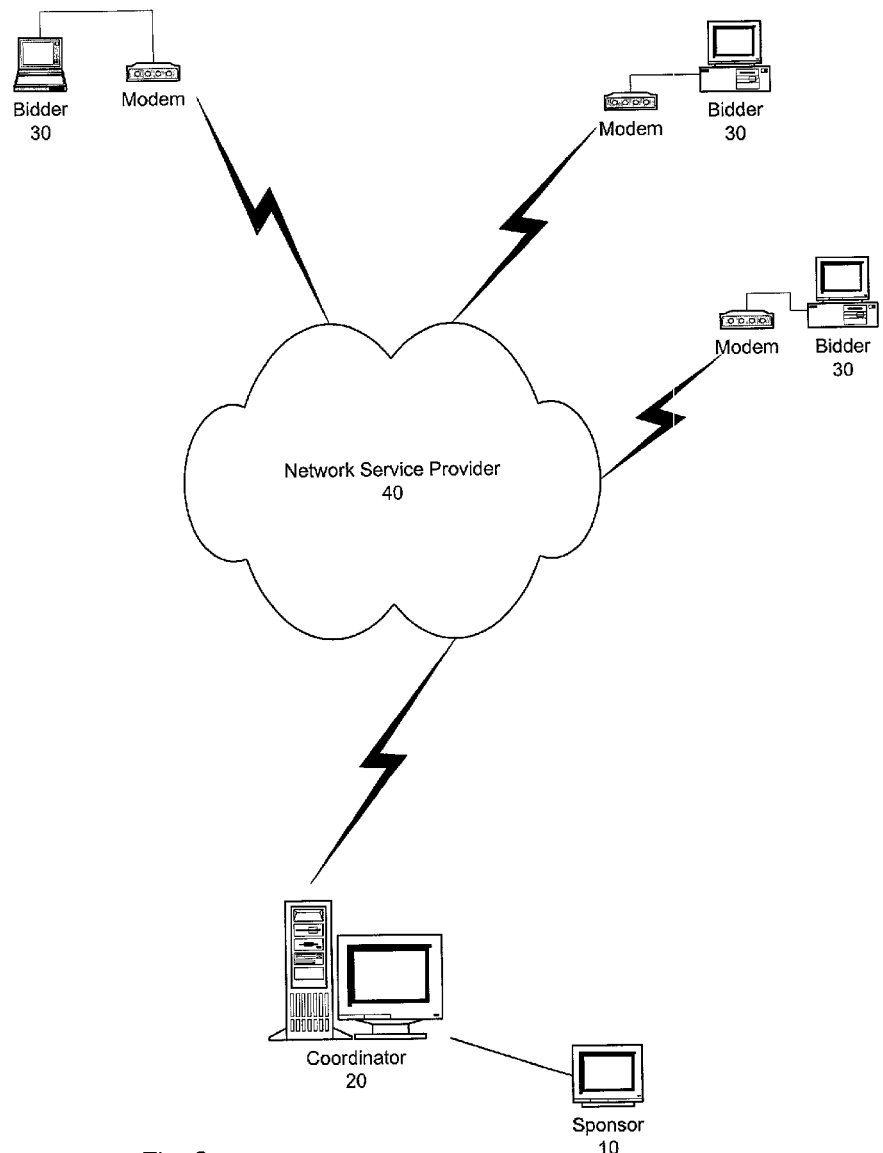
FIG. 2 is a schematic illustration of communications links between the coordinator, the buyer, and the suppliers in an embodiment of an auction.

Information may be conveyed between the coordinator 20 and the bidders 30 via any known communications medium. As shown in FIG. 2, bidders 30 may be connected to the auction through the Internet via a network service provider 40 accessed, for example, through a dial-up telephone connection. Alternately, sponsors 10 and bidders 30 may be coupled to the auction by communicating directly with the coordinator 20 through a public switched telephone network, a wireless network, or any other known connection method. Other methods of connecting sponsors 10 and bidder 30 and other communications mediums are known to those skilled in the art, and are intended to be included within the scope of the present invention.

Figure 3:
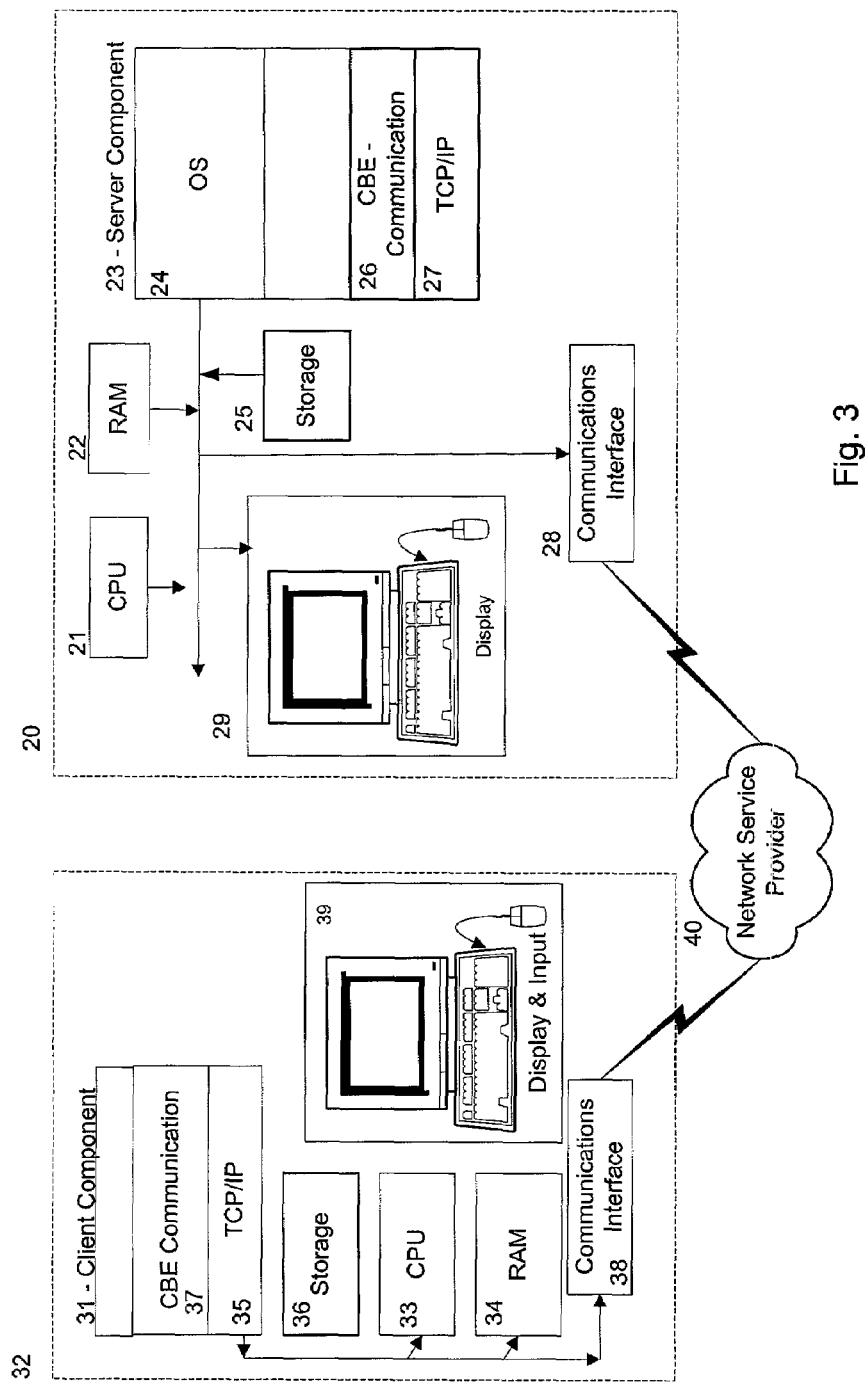
FIG. 3 is a schematic illustration of auction software and computers hosting that software in an embodiment of an auction.

A computer software application may be used to manage the auction. The software application may include two components: a client component 31 and a server component 23. FIG. 3 illustrates a server component 23 and a client component 31 resident in host computers in a first embodiment. As may be seen in FIG. 3, the server component of that embodiment includes an operating system 24, competitive bidding event or auction communication software 26, and Internet protocol software 27. The server software is hosted on a computer 20 having a processor 21, random access memory 22, and a data storage facility 23. The host computer 20 also includes input and output devices 29 such as, for example a monitor, printer, mouse and keyboard, and a communications interface 28 for communicating with the client component 31. The client component of the embodiment illustrated in FIG. 3, includes competitive bidding event communication software 37, and Internet protocol software 35. The client component software is hosted on a computer 32 having a processor 33, random access memory 34, and a data storage facility 36. The host computer 32 also includes input and output devices 39 such as, for example a monitor, printer, mouse and keyboard, and a communications interface 38 for communicating with the server component 23.

The client component 31 is used by the bidders 30 to make bids during the auction, and to receive and display feedback from the auction. The client component may, for example, be a program that is installed on a bidder's computer, or it may be software that is accessed and run from a Website. Bids can typically only be submitted using the client component of the application, thereby ensuring that sponsors 10 cannot circumvent the bidding process, and that only invited suppliers 30 participate in the bidding. Each computer software application may be stored in a data storage device and executed by a processor such as those described in connection with FIG. 4 hereinbelow.

Bids are sent over the communications medium to, for example, the auction coordinator, or where the sponsor 10 is performing auction coordination tasks, directly to the sponsor 10. Bids are received by the server component 23. The client component includes software functions for making a connection over the Internet, or other medium, to the server component. Bids are submitted over this connection and feedback is sent to connected bidders 30.

When a bidder 30 submits a bid, that bid is sent to the server component and evaluated to determine whether it is a valid or acceptable bid. Feedback about received bids is sent to connected bidders 30 as is applicable, enabling bidders 30 receiving feedback to see changes in market conditions and plan competitive responses.

The embodiments described herein utilize an online reverse auction, wherein the present invention is performed by a computer processor, as an example in which the present invention may be utilized. In those examples, suppliers 30 bid to supply goods or services to a purchaser 10 and the purchaser 10 typically purchases the goods or services from the lowest priced qualified bidder 30. It is to be understood, however, that the present invention may be used in other applications, would not necessarily have to occur online, and may be performed by other than a computer processor. The present invention may also be utilized in connection with auctions other than reverse auctions. For example, the present invention may be advantageously utilized with forward auctions, wherein the party offering the highest priced qualified bid, rather than the lowest priced qualified bid, is awarded the goods or services being sold. In the case of a forward auction, the "leading bid" is the highest amount offered and the leading bidder 30 is the purchaser party 10 making that highest offer, while in a reverse auction, the "leading bid" is the lowest amount offered and the leading bidder 30 is the supplier party 30 making that lowest bid. Similarly, placing a "better bid" in a reverse auction indicates placing a lower bid, while placing a "better bid" in a forward auction indicates placing a higher bid.

Figure 4:
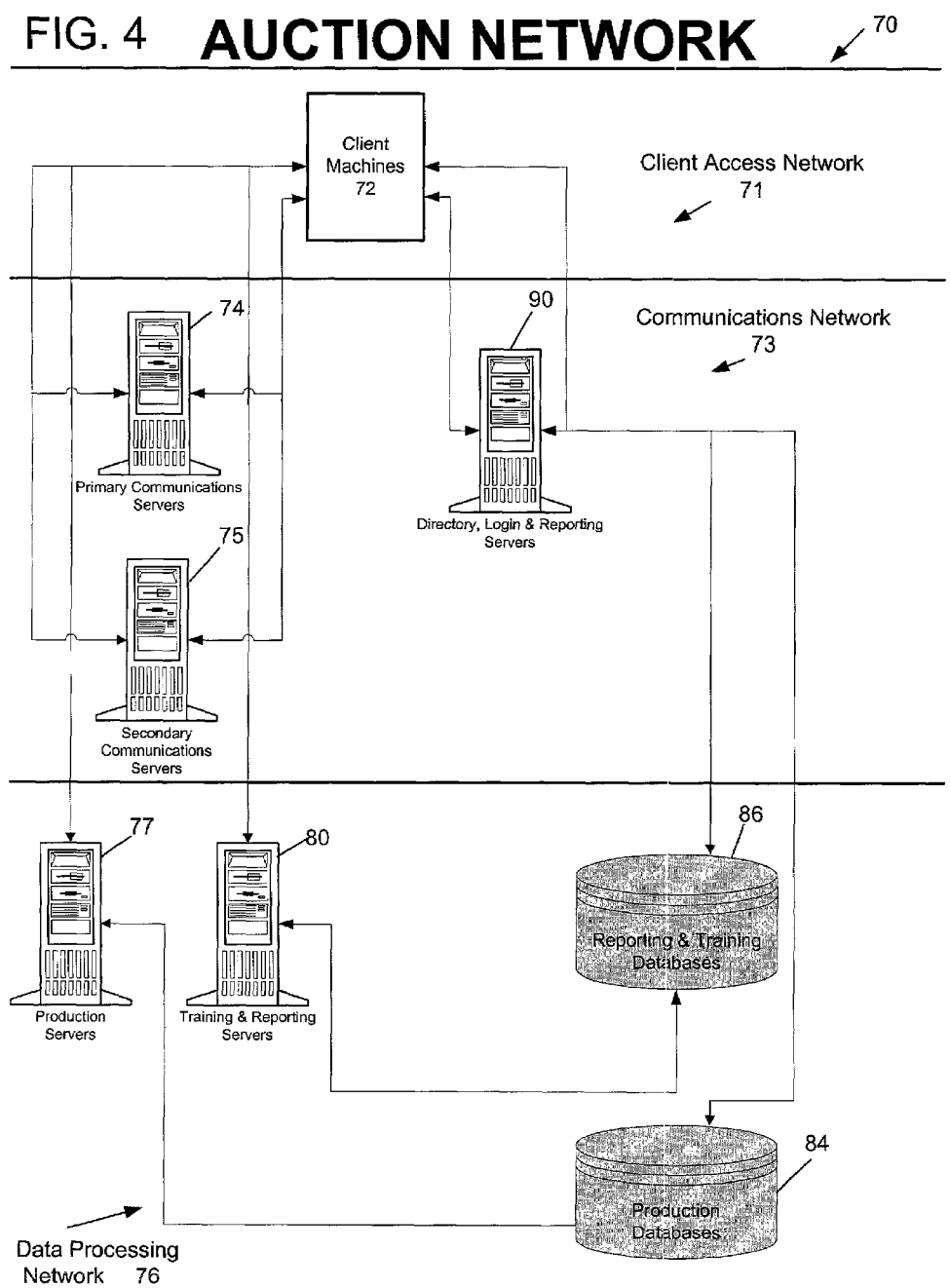
FIG. 4 is a schematic illustration of an embodiment of an auction network.

FIG. 4 is a diagram illustrating an auction network 70 of the present invention for operating an auction, and into which the server component 23 and client component 31 may be incorporated. The auction network 70 may be divided into three functional sections: a client access network 71, a communications network 73, and a data processing network 76. The client access network 71 may, for example, include one or more client machines 72 for accessing and communicating with the communications network 73. The communications network 73 may include one or more primary communications servers 74, secondary communications servers 75, and directory, login and reporting servers 90. The data processing network 76 may include production servers 77, training and reporting servers 80, reporting and training databases 86, and production databases 84. The production servers 77 and training and reporting servers 80 are referred to collectively herein as bid servers 77 and 80.

The client machines 72 may be, for example, personal computers and may be located at each bidder 30 and purchaser site 10 for accessing the auction. The client machines 72 may access the auction by, for example, connecting to a web site operated by the party hosting the auction. The client machines 72 may also receive software from the communications network 73 that facilitates communications with the communications network 73. Each client machine 72 may have a processor that executes applicable software, and a data storage device that stores applicable software and other auction data.

The primary communications servers 74 are utilized to provide information to bids 58 received from the client machines 72 to the bid servers 77 and 80, and to provide that bid information from the bid servers 77 and 80 to the client machines 72. The primary communications servers 74 may furthermore act as a firewall to prevent direct access to the bid servers 77 and 80 by the client machines. The secondary communications servers 75 act as backups to the primary communications servers 74. The secondary communications servers 75 will perform the communication functions normally performed by the primary communications servers 74 if a failure occurs in the primary communications servers 74, thereby providing redundancy to the auction network 70.

The directory, login, and reporting servers 90 may perform a variety of functions that may be performed by a single server or include separate servers for the various functions. The directory, login, and reporting servers 90 may include a web server that acts as a portal for access to the auction network 70. As such, the directory, login, and reporting servers 90 will receive login requests for access to the auction network 70 via, for example, the Internet. The directory, login, and reporting servers 90 may make access decisions as to whether a client machine 72 is permitted to access the communications network 73. If access is permitted, the directory, login, and reporting servers 90 will direct the client machine 72 to the appropriate portion of the auction network 70. The directory, login, and reporting servers 90, may provide reports to client machines 72. For example, information from prior auctions which may be utilized by purchasers 10 to make a decision as to which bidder 30 will be awarded the sale and to permit the purchaser 10 to consider the way in which the auction proceeded so that future auctions may be refined.

Figure 5:
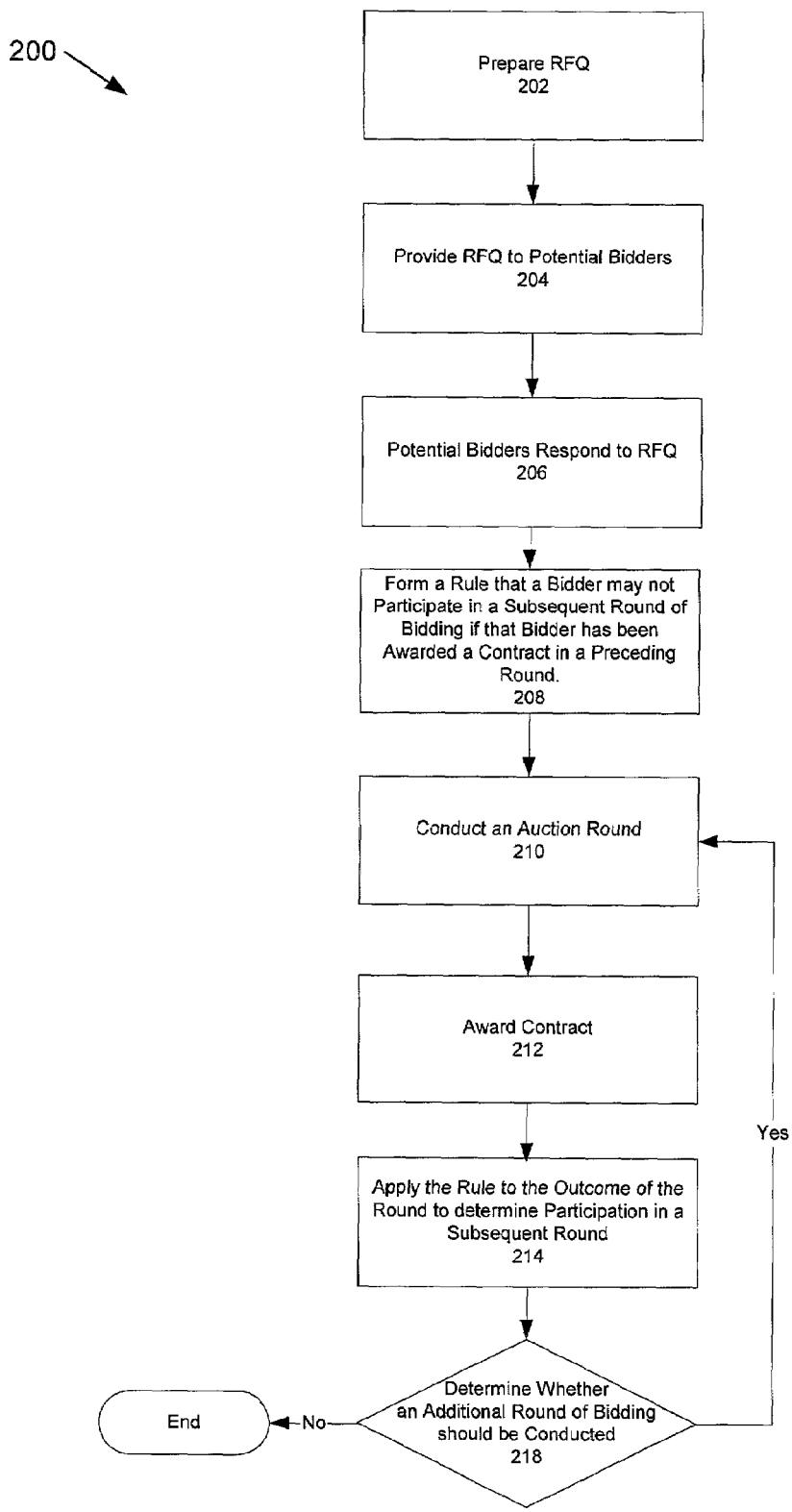
FIG. 5 is a flow diagram illustrating an embodiment of an auction that occurs in rounds, in accordance with the present invention.
Figure 6:
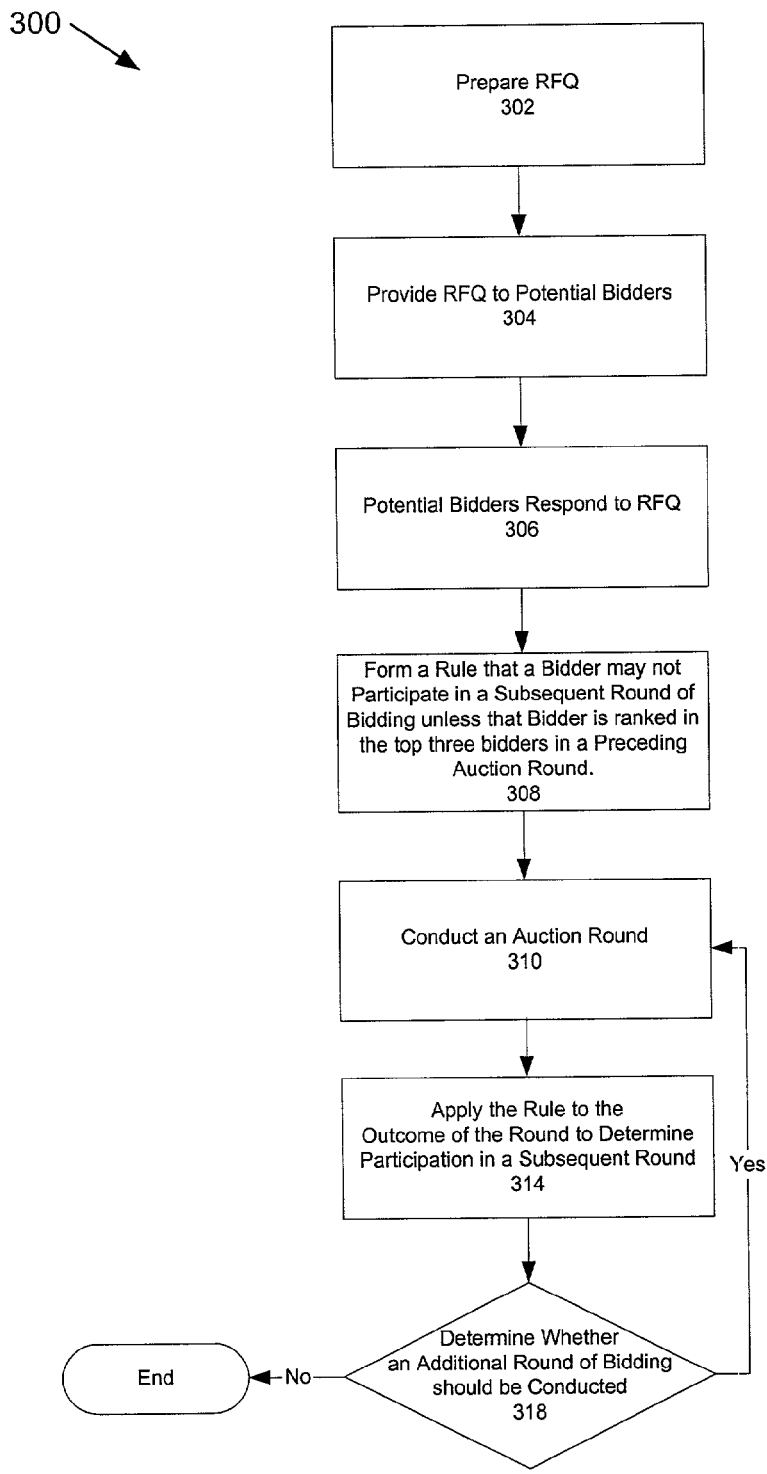
FIG. 6 is a flow diagram illustrating another embodiment of an auction that occurs in rounds, in accordance with the present invention.
Figure 7:
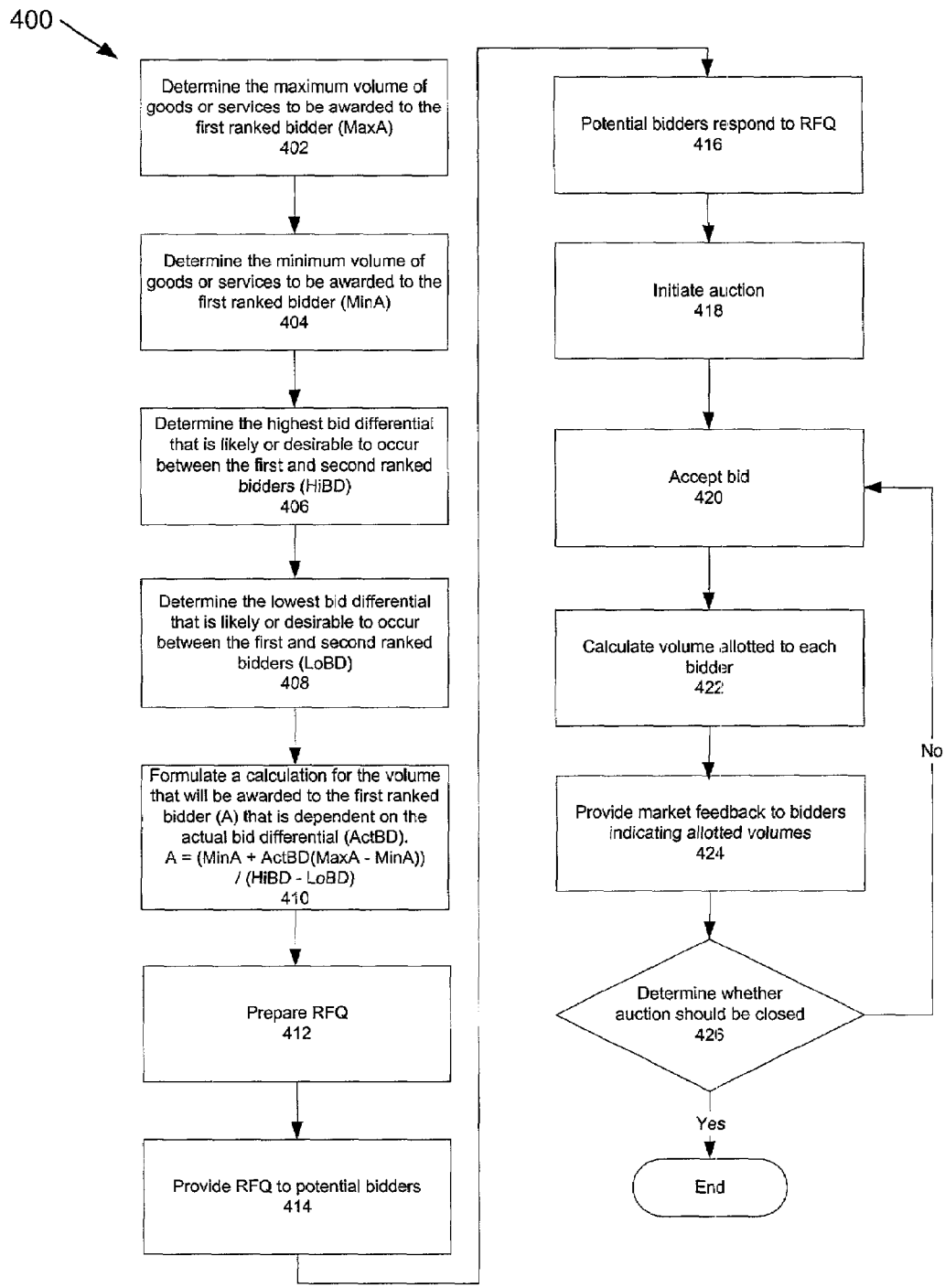
FIG. 7 is a flow diagram illustrating an embodiment of an auction in which multiple contracts are awarded, in accordance with the present invention.

The production servers 77 run the bidding software that facilitates the auction process such as, for example, the software illustrated in FIGS. 5, 6 and 7. The production servers 77 may communicate with client machines 72 through primary and secondary communications servers 74 and 75. The production servers 77 may also be redundant so that if a failure occurs in the production server 77 that is being utilized in an auction event, the redundant backup production server 77 may perform the functions of the failed production server 77 and, thus, prevent failure of the auction.

The training and reporting servers 80 operate in a manner similar to the production servers 77 and provide reports for auctions. It is useful to operate test auctions to test the operating systems and to train personnel and clients. Such testing may be performed on the production servers 77 or, to prevent any degradation of system operation in actual auctions, one or more separate training servers may be utilized for testing and training. Reporting may also be accomplished on the production servers 77 or the report creation functions may be offloaded to one or more reporting servers 80. The reporting servers 80 may furthermore be combined with the training servers 80.

Each server 74, 75, 77, 80, and 90 may have a processor that executes applicable software, and a data storage device that stores applicable software and data. It should be noted that, although the present invention is described in terms of a server component and a client component, one skilled in the art will understand that the present invention is not limited to a client/server program relationship model, and may be implemented in a peer-to-peer communications model or any other model known to those skilled in the art.

Data related to auctions may furthermore be held in one or more storage devices. The data storage devices may, for example, be a magnetic storage device, a random access memory device (RAM), or a read only memory device (ROM). The data may include pre-auction data, post auction data, and data that is related to active auctions. Pre-auction data may include, for example, suppliers 30 that are permitted to bid on a particular auction and the scheduled auction starting and ending times. Post auction data may include the bids and bid times received in a particular auction and reports displaying that data in user friendly formats. Active auction data may include data received from the bidders 30 as the auction is taking place and related data such as the rank of each bidder 30.

The "rank" of the bidders 30 is generally determined by comparing the lowest amount bid by each bidder 30 and ordering the bidders 30 according to those lowest bids. The bidder 30 ranked first is the bidder 30 that has bid an amount lower than any other bidder 30 in a reverse auction. The last rank may be a rank equal to the number of bidders 30 who have submitted bids in the auction. In the case of tie bids between bidders, the last rank may be a rank equal to the number of unique bids by each bidder. In a reverse auction based on price only, the bidder 30 having that last rank is the bidder 30 that has submitted the highest amount.

Of course, there are many known ways to calculate rank, and any of those may be used in connection with the subject invention, and are intended to be within the scope of the present invention. The bidders 30 are generally ranked between first and last according to the amounts of their lowest submitted bids in a reverse auction. Thus, a higher, or better ranked bidder 30 in a reverse auction is a bidder 30 who has placed a comparatively lower bid, while a higher, or better ranked bidder 30 in a forward auction is a bidder 30 who has placed a comparatively higher bid.

An auction may alternately be based on one or more factors other than price, such as quality, delivery factors, and/or other factors that are referred to herein collectively as "total value." Thus, rank may also be based on factors other than price, including total value and any other factor that is useful in an auction setting. A bid or bid amount is a value that is submitted by each participating bidder 30 for comparison to the bids of other bidders 30, and may likewise be based on a variety of bid factors that are considered important to the bid participants. Those factors may include, for example, price, quality, other costs such as delivery costs, or a total value. Bids may also be placed in a number of ways including, for example, absolute total value, or comparative value such as bidding in relation to an index price.

Three databases, or groupings of databases, are incorporated into the auction network illustrated in FIG. 4. The production databases 84 hold data that will be used by or is received from the production servers 77, while the reporting and training databases 86 hold data that will be used by or is received from the training and reporting servers 80.

The directory, login, and reporting servers 90 illustrated provide a web portal for the client machines 72. The directory, login, and reporting servers 90 provide an initial contact point for the client machines 72, access to auctions in which the client machine 72 is permitted to participate, and reports relating to active and closed auctions.

One skilled in the art will recognize that certain components of the network described herein, while beneficial to an auction network, are not necessary components in an operational auction network. For example, the secondary communications servers 75 could be removed where the benefit of redundancy is not desired, and the primary communications servers 74 could be removed and the client machines 72 could communicate directly with the bid servers 77 and 80.

The present invention permits a sponsor 10 conducting more than one auction to base the conduct of a subsequent auction on one or more occurrences in a previous auction. In one embodiment, the present invention includes a method of conducting an auction in at least two rounds. In that embodiment, a subsequent round of auction is conducted in accordance with a rule, that is defined prior to a preceding round of auction and is based on one or more occurrences in the preceding auction round. During or after the preceding round of auction, the occurrences are considered in light of the rule, and a subsequent auction round is then conducted utilizing the rule. The present invention may, for example, be executed on the auction network 70, or may be operated manually or in connection with other known mechanisms.

Each auction round may be viewed as a separate auction wherein identified goods or services are placed for auction, bidders 30 place bids to purchase or sell the identified goods or services, a predefined period elapses after which the auction terminates and, typically, a contract is awarded for the sale of the identified goods or services. Furthermore, a contract is typically awarded to the lowest bidding supplier or the highest bidding purchaser, depending on whether suppliers or purchasers are bidding in the auction.

A sponsor 10 may wish to conduct an auction in several rounds for a variety of reasons including, for example, the need to purchase more goods than may be supplied by the bidders 30 or a desire to learn from an early auction round and make alterations in subsequent rounds. In certain circumstances, it is beneficial to award contracts to multiple bidders 30 in multiple rounds rather than awarding contracts to the lowest bidders 30 in a single auction round because market or bidding dynamics will cause total bid prices to be lower when bidding in multiple rounds. For example, where multiple contracts will, or are likely, to be awarded from a single auction, a bidder 30 may place bids that maintain that bidder 30 in second or higher rank, knowing that it will be awarded a contract at a higher price in spite of not being the lowest bidder. Bidding in rounds may beneficially diminish the practice of bidding for second or higher rank, because only the first ranked or lowest bidder is awarded a contract in each round.

FIG. 5 is a flow diagram 200 illustrating an embodiment of the present invention wherein a purchasing sponsor 10 desires to purchase a large quantity of goods, and wherein a second auction round will include qualifying bidders 30 from a first auction round. At 202, the sponsor 10 will typically prepare a request for quote ("RFQ") describing the goods to be purchased. At 204, that RFQ is provided to potential bidders 30. Each potential bidder 30 that desires to participate in the auction may then respond to the RFQ at 206. The potential bidder 30 will typically respond by indicating the desired goods that bidder 30 is willing to provide, the quantity and quality of the goods that the bidder 30 can provide, and conditions under which the bidder 30 can provide those goods in those quantities and qualities. Those conditions may include the time period during which the identified goods may be provided. In a certain circumstance, none of the potential bidders 30 may be able to provide the desired quantity of goods in the desired time period. In another circumstance certain bidders 30 may be able to provide the entire desired quantity of goods, while other bidders 30 cannot provide the entire quantity desired. In the latter circumstance, the sponsor 10 may wish to permit those potential suppliers 30 that cannot provide the entire quantity of goods to participate in one or more rounds of the auction, for example, to assure that a minimum number of bidders 30 participate in the auction, or because they are preferred suppliers 30.

The sponsor 10 may wish to contract for all of desired goods or services at one time despite of the inability of all bidders 30 to provide all desired goods or services. Thus, the sponsor 10 may choose to award contracts to multiple low bidders 30 or may conduct multiple rounds of bidding and award contracts to the lowest bidder 30 in each round until the total quantity of goods desired has been purchased. If the sponsor 10 desires to conduct bidding in rounds, at 208, the sponsor 10 may formulate a rule conditioning the inclusion of a bidder 30 in a subsequent auction round on that bidder 30 having not been awarded a contract in a preceding round. That rule may or may not be expressed to potential bidders 30 before the opening of, or during, a given auction round. Thus at 210, the sponsor 10 may conduct a first round auction, the outcome of which is an award of a contract to the lowest bidder 30 at 212. The sponsor 10 will then apply the rule that awarded bidders 30 may not participate in subsequent rounds to an appropriate occurrence in the first round of the auction at 214. In the present example, the rule is applied to the outcome and, more specifically, to the awarded bidder 30, to determine participation in the second auction round. Thus, in the example of FIG. 5, the bidder 30 that is awarded a contract in the first auction round may not participate in the second auction round. At 218, the sponsor 10 will determine whether additional goods or services should to be purchased at that time, and if an additional purchase is to be made, an additional auction round will be conducted. The sponsor 10 will repeat the process of conducting an auction round at 210, awarding a contract at 212, applying the rule to the outcome at 214, and determining whether another auction round should be conducted at 218. Thus, the contract that is awarded each round may, for example, cover a portion of the entire quantity of goods or services desired to be purchased in the auction.

When more than two rounds of bidding are contemplated, under the circumstances described in connection with FIG. 5, the sponsor 10 may condition participation in subsequent rounds on having not received an award in any preceding round. Thus, the sponsor 10 may subtract the amount of goods purchased thus far in the auction from the amount of goods needed to determine whether additional goods need to be purchased at 218. If additional goods need to be purchased, the sponsor 10 will typically return to 210 and conduct an additional auction round that does not include successful bidders 30 from previous rounds. The sponsor 10 will then repeat the process of conducting an auction round at 210, awarding a contract at 212, applying the rule to the outcome at 214, and determining whether another auction round should be conducted at 218, until no further auction rounds are necessary.

FIG. 6 illustrates an embodiment of the present invention, wherein a purchasing sponsor 10 has little experience with electronic auctions, at least in connection with goods to be purchased at that time, and wherein the sponsor 10 will conduct a second auction round including qualifying bidders 30 from a first auction round. Such a sponsor 10 may wish to learn from an early auction round and make alterations in subsequent rounds. As in the example illustrated previously in FIG. 5, the sponsor 10 prepares an RFQ at 302 and provides that RFQ to potential bidders 30 at 304. At 306, the potential bidders 30 respond to the RFQ. In the specific embodiment illustrated in FIG. 6, the sponsor 10 is interested in determining which bidders 30 will actively participate in an initial auction round. Therefore, the sponsor 10 will initiate a first auction round for purchasing a portion of the total goods to be purchased in the auction. Prior to conducting the first auction round, however, the sponsor 10 will create a rule at 308 for including a bidder 30 in a subsequent auction round that is based on an occurrence in the first auction round. That rule may or may not be expressed to the potential bidders 30. The rule utilized in the example depicted in FIG. 6 limits inclusion in subsequent auction rounds to bidders 30 ranking in the top three bidders 30 in the first auction round. Thus, only the top three bidders 30 in the first auction round will be permitted to participate in subsequent auction rounds. Reasons for limiting the number of bidders 30 include, but are not limited to, a desire to minimize the number of entities that may view the auction to protect privacy, and to remove bidders 30 who are unlikely to be competitive. Other rules that may be utilized include, but are not limited to, permitting only those bidders 30 that place a minimum number of bids to participate subsequently, allowing only those bidders 30 whose best bids fall within a certain number or percentage of dollars or other units of the leading bid to participate in subsequent auction rounds, and/or allowing only non-leading bidders (i.e., bidders that did not win an award in a previous round) to participate in a subsequent round.

After the rule has been formulated, an auction round will be conducted at 310. At 314, the rule is applied to the appropriate occurrence or occurrences of the first auction round to select, in the example provided in FIG. 6, the three lead bidders 30 for participation in the next auction round. At 318, a determination is made as to whether another auction round is to be conducted. If another auction round is to be conducted, the sponsor 10 will repeat the process of conducting an auction round at 310, applying the rule to the outcome at 314, and determining whether another auction round should be conducted at 318, until no further auction rounds are necessary. It is noted that a rule formulated in, for example, a first round auction, may be applied to one or more subsequent auction rounds. Furthermore, additional rules may be developed in rounds subsequent to the first round. Thus a single rule, formulated during or after the first auction, may, for example, be the only rule applied to subsequent auction rounds. Alternately, one or more rules formulated in preceding rounds may be applied in varying combinations to subsequent auction rounds. Also, in multiple round auctions, no rule may be applied to certain rounds.

Various forms of auctions may also be utilized in different rounds in the present invention. For example, a purchasing sponsor 10 may conduct a sealed bid type first round auction, wherein each bidder 30 submits a single bid to the sponsor 10 in a sealed envelope. The sponsor 10 then opens all of the bids at a prearranged time. The sponsor 10 may select a winning bidder 30, usually on the basis of the lowest bid submitted, at that time, or the sponsor may use the sealed bids solely to make a decision as to how the second round auction will be conducted. The second round auction could then be, for example, an electronic auction in which only bidders 30 qualifying in the first round auction are permitted to participate. For example, in a certain auction a first round sealed bid is used to determine which bidders 30 qualify to participate in a second round auction to follow.

In another embodiment, wherein similar or identical goods or services are purchased in both the first and second rounds, the first round price is utilized as an initial and/or ceiling bid for each bidder 30 in the second round. Where the sealed bid is utilized as an initial and a ceiling bid, the sealed bid price submitted by each bidder 30 qualifying to participate in the second round auction is entered as an initial bid for that bidder 30 at the beginning of the second round auction and bidders 30 are not permitted to place bids greater than that initial ceiling bid throughout the second round auction. Of course, the initial ceiling bid may also be utilized in additional rounds subsequent to the second round. Furthermore, as may be seen in the previous example, multiple rules may be formulated from one or more auction rounds and those rules may determine which bidders 30 qualify to participate in future rounds, bidder 30 initial bid pricing, and/or ceiling bid level for each bidder 30. As will be recognized by one skilled in the art, any of a variety of decisions that may be based on prior bidding history may also be considered when determining rules and conditions for subsequent auction rounds. For example, the quantity of goods to be auctioned in a round may be determined by pricing levels achieved for various quantities in previous rounds or quantities offered by bidders in previous rounds.

In certain circumstances, a purchasing sponsor 10 may desire to purchase goods from two or more suppliers 30. In such a situation, a single supplier 30 may be able to provide the entire quantity of goods desired. Multiple bidders 30, furthermore, typically do not place equal low bids. Thus, there may be a financial benefit to the sponsor 10 to purchase all goods from the lowest bidding supplier 30. The sponsor 10 may, however, desire to purchase goods from multiple bidders 30, for example, to assure a steady supply of goods where the sponsor 10 envisions a likelihood that one supplier 30 may, for example, have production problems that interrupt delivery of a critical component. The sponsor 10 may, therefore, wish to award contracts to multiple low bidders 30 or may conduct multiple rounds of bidding and award contracts to the lowest bidder 30 in each round until the total quantity of goods desired has been purchased.

An embodiment of the present invention, wherein the sponsor 10 wishes to purchase a good from two suppliers 30 in two auction rounds to assure a steady supply of that critical good, is described with reference to FIG. 5. In that embodiment, that critical good is a necessary component for operation of many products manufactured by the sponsor 10. Furthermore, the sponsor 10 has previously experienced shortages of the critical good because a single supplier 30 had encountered production problems. Thus, the sponsor 10 wishes to purchase between 50% and 70% of the expected supply of the critical good that the sponsor 10 will need over the next year from a single bidder 30 in a first round auction. The sponsor 10 wishes furthermore to purchase the remainder of the critical good that it will need over the next year from a different single bidder in a second round auction.

The critical good embodiment will be further described with reference to FIG. 5, and the critical good will be assumed to be an integrated circuit. Thus, at 202 of FIG. 5, the sponsor 10 prepares an RFQ stating its integrated circuit requirements including the quantity of integrated circuits that are projected to be needed over the next year, and a requirement that any participating bidder 30 must be able to provide at least 50% of the total quantity needed over the next year. The sponsor 10 also provides an optional statement in the RFQ informing the bidders 30 that the auction will be conducted in two rounds and only 50% to 70% of the total integrated circuit requirement will be purchased from the successful bidder 30 in the first auction round. The RFQ is provided to potential suppliers 30 at 204 and the potential suppliers 30 respond to the RFQ at 206. As previously discussed in connection with FIG. 5, the sponsor 10 formulates a rule conditioning the inclusion of a bidder 30 in a subsequent auction round on that bidder 30 having not been awarded a contract in a preceding round. Thus, as desired, the bidder 30 awarded a contract in the first auction round will not participate in the second auction round, and so may not be awarded an additional contract in the second auction round. At 210, the sponsor 10 conducts a first round auction, the outcome of which is an award of a contract to the lowest bidder 30, at 212. That bidder 30 may be given an option at the time of the award to select the quantity of integrated circuits that it will provide under the contract, with the constraints that the awarded bidder 30 must provide between 50% and 70% of the total requirements. Alternately, the awarded bidder 30 may state the maximum quantity of integrated circuits that it can provide prior to commencement of the auction and be awarded the lesser of that maximum quantity or 70% of the sponsor requirement, for example. The contracted quantity of goods may also be provided by utilizing any other known method of making such a determination. The sponsor 10 will then apply the rule that awarded bidders 30 may not participate in subsequent rounds to the second auction round at 214, and conduct a second auction round accordingly. The winning bidder 30 in the second auction round will then be awarded a contract for the remaining quantity of goods required by the sponsor 10.

In another embodiment of the present invention, multiple bidders may be awarded contracts after a single auction round. In that embodiment, the amount of the total requirements awarded to each bidder 30 receiving a contract may be a function of the difference between the bids placed by the awarded bidders. As was previously discussed, in such a circumstance a bidder 30 may bid to achieve a rank of second, for example, rather than first, knowing that as the second place bidder 30 they are likely to make a sale in the auction. Thus, the second ranked bidder 30 may not have an incentive to approach the first place bidder 30 but rather may be encouraged to place the highest second place bid possible. Of course, in auctions wherein more than two bidders 30 are to be awarded contracts in a single auction round, bidders 30 may likewise bid for third rank or fourth rank or any other rank that is likely to be awarded a contract. Such a circumstance is undesirable from the perspective of a sponsor 10. A sponsor 10 in, for example, a reverse auction will typically desire that bidding suppliers 30 reduce their bids to the lowest possible amount. By awarding one or more contracts to bidders 30 ranked other than first, however, a sponsor 10 may reduce the incentive for a bidder 30 to place a bid that will surpass the first ranked bidder. Furthermore, the lead bidder generally has no incentive to improve a leading bid because, as lead bidder, that party would normally be awarded a contract regardless of the difference between the leading bid and the second ranked bid. Thus, the present invention provides incentive, in cases where multiple bidders may be awarded contracts from a single auction round, for a first ranked bidder to better a first ranked bid and for a lower ranked bidder to place an improved bid even if that bid is not adequate to improve the rank of that bidder.

The present invention provides incentive for leading bidders to improve their bids in such cases by tying the volume of goods or services awarded to each bidder 30 to the difference between those leading bids. For example, as described in the previous example, the sponsor 10 may wish to purchase 50% to 70% of its requirements; from the lowest, or first ranked bidder, and the remaining portion of its requirements from the second lowest, or second ranked bidder. The sponsor 10 may, however, wish to award contracts to the two leading bidders in a single auction round. The sponsor 10 may, therefore, vary the volume of the award to the first ranked bidder from 50% to 70% depending on a factor that may be related to the difference between the first ranked bid and the second ranked bid compared to a desired differential bid amount. That desired differential bid amount may, furthermore, be a maximum amount by which the sponsor 10 contemplates that the first ranked bidder may better the second ranked bidder.

FIG. 7 illustrates an embodiment of the present invention wherein two bidders are to be awarded contracts in a single auction round 400. At 402 through 410, the sponsor 10 prepares a calculation for determining the volume of awards that will be made to successful bidders. In this example, that calculation includes determining the maximum and minimum volumes to be awarded to the leading successful bidder at 402 and 404. That leading successful bidder is typically the lowest bidder in a reverse auction and the highest bidder in a forward auction. It will be recognized, however, that the lowest bidder in a reverse auction may be disqualified or not awarded a contract for another reason and that the leading successful bidder may be other than the lowest bidder. Likewise, it will be recognized that the highest bidder in a forward auction may be disqualified or not awarded a contract for another reason and that the leading successful bidder may be other than the highest bidder. Once the minimum and maximum volumes have been determined, the sponsor 10 may calculate the volume differential by subtracting the minimum volume from the maximum volume.

The sponsor 10 will also determine a range of differential in the best bid placed by the leading successful bidder, or first ranked bidder, and the second ranked qualified bidder. In this example, the highest bid differential that the sponsor 10 wishes to consider in determining how much volume will be awarded to the bidders 30 is established at 406 and the lowest bid differential that the sponsor 10 wishes to consider in determining how much volume will be awarded to the bidders 30 is established at 408. The bid differential (expressed, for example, in dollars/unit) may be calculated by subtracting the low bid differential from the high bid differential. The volume and bid differential values may then be utilized in formulating a calculation for the volume that will be awarded to the bidders 30 at 410.

Thus, for example, the first ranked bidder may be awarded a contract for a minimum amount to be awarded to the first ranked bidder plus an additional amount related to the difference between the first and second ranked bids. As may be seen at 410, the additional amount may be calculated by finding the difference between the maximum volume to be awarded to the first ranked bidder and the minimum volume to be awarded to the first ranked bidder and multiplying that by a factor between zero and one. The factor may furthermore be related to the difference between the best bid placed by the first ranked bidder and the best bid placed by the second ranked bidder. Thus, when calculating an award amount in terms of percent of the total amount to be awarded, the equation may appear as:

$$A = MinA + BDF(MaxA - MinA)$$

wherein:

A is the actual percent of total required volume to be awarded to the first ranked bidder;

BDF is the bid differential factor;

MinA is the minimum percent of total required volume to be awarded to the first ranked bidder; and MaxA is the maximum percent of total required volume to be awarded to the first ranked bidder.

The bid differential is typically a factor that is based on the difference between the first and second ranked bids. When a proportionate factor is desired, the bid differential factor may, for example, be equal to the actual bid differential that results from the auction, divided by the difference between an expected high bid differential and an expected low bid differential. Thus, the equation may appear as:

$$BDF=ActBD/(HiBD-LoBD)$$

wherein

ActBD is the actual bid differential resulting from the auction, e.g., the difference between the best bid (in dollars/unit) placed by the first ranked bidder and the best bid (in dollars/unit) placed by the second ranked bidder;

HiBD is the highest expected bid differential; and

LoBD is the lowest expected bid differential.

For example, the sponsor 10 in a reverse auction may conclude that if the first ranked bid is at least $100.00 per unit less than the second ranked bid, the sponsor 10 will award 70% of its total requirement to the first ranked bidder. Furthermore, if the first and second ranked bids are equal, the sponsor 10 will award one half of the total requirement to each of those bidders. Thus, where the sponsor 10 wishes to award 50% of its total requirement to the first ranked bidder when the actual bid differential is $0.00 and 70% to the first ranked bidder when the actual bid differential is $100.00, the bid differential factor (BDF) would be determined as follows:

$$BDF=ActBD/(100-0).$$

Continuing with this example, the values of MinA and MaxA would be 50% and 70%, respectively, since the most the sponsor wishes to award to the first ranked bidder is 70% of its requirement and the least the sponsor wishes to award to the first ranked bidder is 50% of its requirement. In this example, if the first ranked bidder places a best bid that is $50.00 per unit less than the best bid of the second ranked bidder, the bid differential factor would be:

$$BDF=50/(100-0)=0.5$$

and the award to the first ranked bidder would be:

$$A=50\%+0.5(70\%-50\%)=60\% \text{ of the sponsor's requirement}$$

Because the sponsor 10 in this example wishes to award contracts to the top two bidders, the second ranked bidder would be awarded the remaining requirement. That remaining requirement, in the present example, would be the total requirement, or 100%, less the amount awarded to the first ranked bidder, or 60%, conferring an award of 40% of the total requirement of the sponsor 10 to the second ranked bidder.

Alternately, if the first ranked bidder had actually placed a best bid $20.00 per unit under the best bid of the second ranked bidder, the bid differential factor would be:

$$BDF=20/(100-0)=0.2$$

and the award to the first ranked bidder would be:

$$A=50\%+0.2(70\%-50\%)=54\% \text{ of the sponsor's requirement}$$

Again, the second ranked bidder would be awarded the remaining requirement, which would be the total requirement, or 100%, less the amount awarded to the first ranked bidder, or 54%. Thus, an award of 46% of the total requirement of the sponsor 10 would be made to the second ranked bidder.

If the first ranked bidder had actually placed a best bid of $75.00 per unit under the best bid of the second ranked bidder, the bid differential factor would be:

$$BDF=75/(100-0)=0.75$$

and the award to the first ranked bidder would be:

$$A=50\%+0.75(70\%-50\%)=65\% \text{ of the sponsor's requirement}$$

Once again in this example, the second ranked bidder would be awarded the remaining requirement, which would be the total requirement, or 100%, less the amount awarded to the first ranked bidder, or 65%. Thus, the sponsor 10 would award 35% of the total requirement to the second ranked bidder.

As may be seen in this example, the greater the differential between the first and second ranked bids, the greater the amount that is awarded to the first ranked bidder. Therefore, the first ranked bidder is provided an incentive to reduce its already first ranked bid to increase the amount of goods or services that it will be awarded. Similarly, the second ranked bidder is provided with an incentive to reduce its bid, even if that reduction will not cause that bidder to be ranked first, to decrease the amount that the first ranked bidder will be awarded and, thereby, increase the amount of the award to that second ranked bidder. Of course, the second ranked bidder may also place a bid that moves it to the first rank, thereby further increasing the amount of the award to that bidder.

The ratio example provided above is based on a percentage of total requirement to be awarded to certain bidders 30. The award may, however, have another basis such as, for example, the quantity of goods to be awarded to each bidder 30.

As will be recognized, contracts may be awarded to more than two bidders 30 in a single auction round. In an auction where more than two bidders 30 are to be awarded contracts, a calculation for the volume to be awarded to second and lower ranked bidders 30 may be calculated utilizing steps similar to those described in steps 402 through 410 of FIG. 7. When calculating the volume to be awarded to a second ranked bidder, the maximum volume of step 402 would be the maximum volume to be awarded to the second ranked bidder. Similarly, the minimum volume of step 404 would be the minimum volume to be awarded to the second ranked bidder. The highest bid differential of step 406 would typically be the highest expected or desired differential between the second ranked bidder and the next lower, or third ranked, bidder and the lowest bid differential of step 408 would typically be the lowest expected or desired differential between the second ranked bidder and the next lower ranked bidder. As may be appreciated, the third and fourth ranked bidders could be compared to establish parameters for a third ranked bidder where necessary and subsequent ranked bidders may also have volume awards determined accordingly.

The minimum and maximum amounts to be awarded to each bidder 30 may be any amounts and will likely vary depending on the number of bidders 30 with which the sponsor 10 wishes to contract in the auction round and the capacity of the bidding suppliers 30. For example, where two bidders 30 are to be awarded contracts in a single auction round, the lowest bidder will normally be awarded at least one-half of the total award because that bidder will supply the goods or services at a price that is less than (or at least equal to) the second ranked bidder.

Thus, a minimum award of 50% to the lowest bidder would be common in an auction wherein two bidders 30 are to be awarded. Similarly, in an auction wherein three bidders 30 are to receive awards in a single auction round, the lowest bidder will typically receive an award for at least one-third of the total requirement.

Supplier specific low and high volume limits may also be set. A factor that may be considered when determining a minimum award, for example, is the capacity of the bidding suppliers 30. In certain circumstances, such as when the lowest bidder is unable to produce the maximum amount of product that the sponsor 10 would like to purchase from that bidder, the volume for that bidder may be limited to the capacity of that bidder. The sponsor 10 may also wish to limit a particular supplier to a maximum volume when the sponsor 10 has not had adequate experience with or is otherwise uncomfortable with that supplier. The volume may be expressed in a variety of units including, for example, a number of products to be provided, a number of hours to be expended performing a service, or as a percentage of a total requirement.

The number of awards resulting from a single auction round may, therefore, be variable and may in certain circumstances not be determined until after the auction is closed. For example, the number of bidders 30 that receive awards may be adjustable to assure that the total quantity of goods or services desired may be purchased where the bidding suppliers have limited capacity.

Thus for example, where a first ranked bidder has placed a bid at which the sponsor 10 would be willing or desirous to award 70% of its requirement to that bidder, but that bidder has informed the sponsor 10 that it only has the capacity to provide 60% of the requirement, only 60% of the requirement may be awarded or allotted to that bidder. Allotted business volume is a volume that is calculated during an open auction that is currently in progress, and indicates the quantity of goods or services that would be awarded to each bidder 30 if the auction were to close at that time.

As for the maximum award, that amount is usually determined based on various desires of the sponsor 10. For example, a sponsor 10 may believe that purchasing more than 70% of its critical component supply from a single source places the sponsor 10 at risk for encountering a shortage of components that might affect the production of the sponsor 10. Therefore, the sponsor 10 may limit the maximum amount to be awarded or allotted to the first ranked bidder to 70%.

The sponsor 10 may prepare an RFQ at step 412 and may include information therein regarding volume determinations. At 414, the sponsor 10 may provide the RFQ to potential bidders 30, thereby informing the bidders 30 that the amount of goods to be awarded to the first ranked bidder will be, in this example, between 50% and 70% of the total requirement. Furthermore, the sponsor 10 may inform the bidders 30 through the RFQ that the determination of the quantity of goods or services to be awarded to the first ranked bidder will depend on the differential between the amount of the best bid placed by the first ranked bidder and the amount of the best bid placed by the second ranked bidder. Where two or more bidders 30 are to be awarded contracts in a single auction round, the sponsor 10 may inform the bidders 30 of that fact and apprise the bidders 30 of how the volume calculations will be made for awards at each level.

The potential bidders 30 typically respond to the RFQ by informing the sponsor 10 of any information requested in the RFQ. That information may include the quantity of goods or services that the supplier is capable of providing to the sponsor 10. The sponsor 10 may then arrange the auction parameters, including the volume to be awarded to leading bidders, and initiate the auction at 418. During the auction, bids are accepted at 420. Also, in this embodiment of the auction, which provides market feedback to stimulate further bidding, market feedback including the volume allotted to the bidders 30 if the auction closed under the current conditions is displayed to the bidders 30 at 424. The displayed market feedback may also include other information including, for example, bid amounts that have been placed by each bidder 30. The displayed market feedback may furthermore be provided or not provided at various times during the auction depending on conditions existing in the auction. For example, allotted business volume may not be displayed until enough valid bids have been placed to have 100% of the requirement allotted to bidders 30. Thus, when only one bid has been placed and two bidders 30 are to be awarded contracts, the allotted business volume may be withheld from display until a valid bid is placed by a second bidder such that all of the requirement of the sponsor 10 would be allotted at that time.

The allotted volume may furthermore be displayed to only the bidder 30 to which the volume applies, all participating bidders 30 or a subset of bidders 30. As examples of displaying allotted volume to a subset of bidders 30, the volume feedback may be displayed to bidders 30 that are allotted a volume themselves, or bidders 30 that have placed a bid that surpasses a predefined threshold. As may be appreciated, a variety of requirements could be placed on receipt of feedback. By providing such market feedback, the bidders 30 are informed of the volume that they will be awarded if no other bids are, placed, and are reminded that if they improve their bids they can increase the volume of business that they will be awarded.

A volume that would be allotted to a bidder 30 if that bidder 30 improved its bid may also be calculated and displayed. That volume would be based on the current bids placed by all other bidders 30 and a new bid that the viewing bidder 30 is considering placing. That volume would typically be displayed only at the viewing bidder console to provide feedback to the bidder 30 as to the quantity of goods or services that would be awarded to the viewing bidder 30 if it improved its bid. Thus, a bidder 30 may enter a bid that it is considering placing in, for example, a bid entry window on a computer screen, by selecting that window with an input device such as, for example, a mouse or keyboard, and entering a number therein. The bidder 30 may then select a "calculate volume" facility which may, for example, take the form of a button that may be depressed or selected, and that may be displayed on the screen of the bidder 30. Selection of that facility after entry of a valid bid in the bid entry window will provide the bidder 30 with feedback as to the volume of business that would be allotted to that bidder 30 if that bid is placed.

A sponsor 10 may furthermore vary the volume it is purchasing depending upon the bids received in an auction. For example, a sponsor 10 may estimate that it will require at least a quantity of 100,000 components to supply its production line or the next year. The sponsor 10 may also realize that it could produce enough product to consume 120,000 components during the next year. The sponsor 10 may also realize that it will be able to sell more product if it is able to produce and sell the product at a lower price. Thus, if the sponsor is able to purchase the component at or below a certain price, the sponsor 10 will purchase more components and plan to manufacture more products. The sponsor 10 may, therefore, provide that if one or more of the bidders 30 that will be awarded contracts places a bid below a bid threshold, the volume to be purchased will step up. The sponsor 10 may furthermore incorporate multiple steps for varying levels of bids received. Alternately, the sponsor 10 may utilize an algorithm that varies the volume of the component to be purchased proportionately over a range of bids. It will be recognized that many algorithms may be utilized to adjust the volume of an auction dependent on bid amounts, all of which fall within the scope of the present invention.

The present invention may also incorporate a combination of awarding contracts to multiple bidders 30 in a single auction round and conducting multiple auction rounds. For example, a sponsor 10 may wish to award contracts for a component to two bidders 30 in a first auction round and also base participation in a second auction round for another component on an occurrence during the first round.

Figure 8:
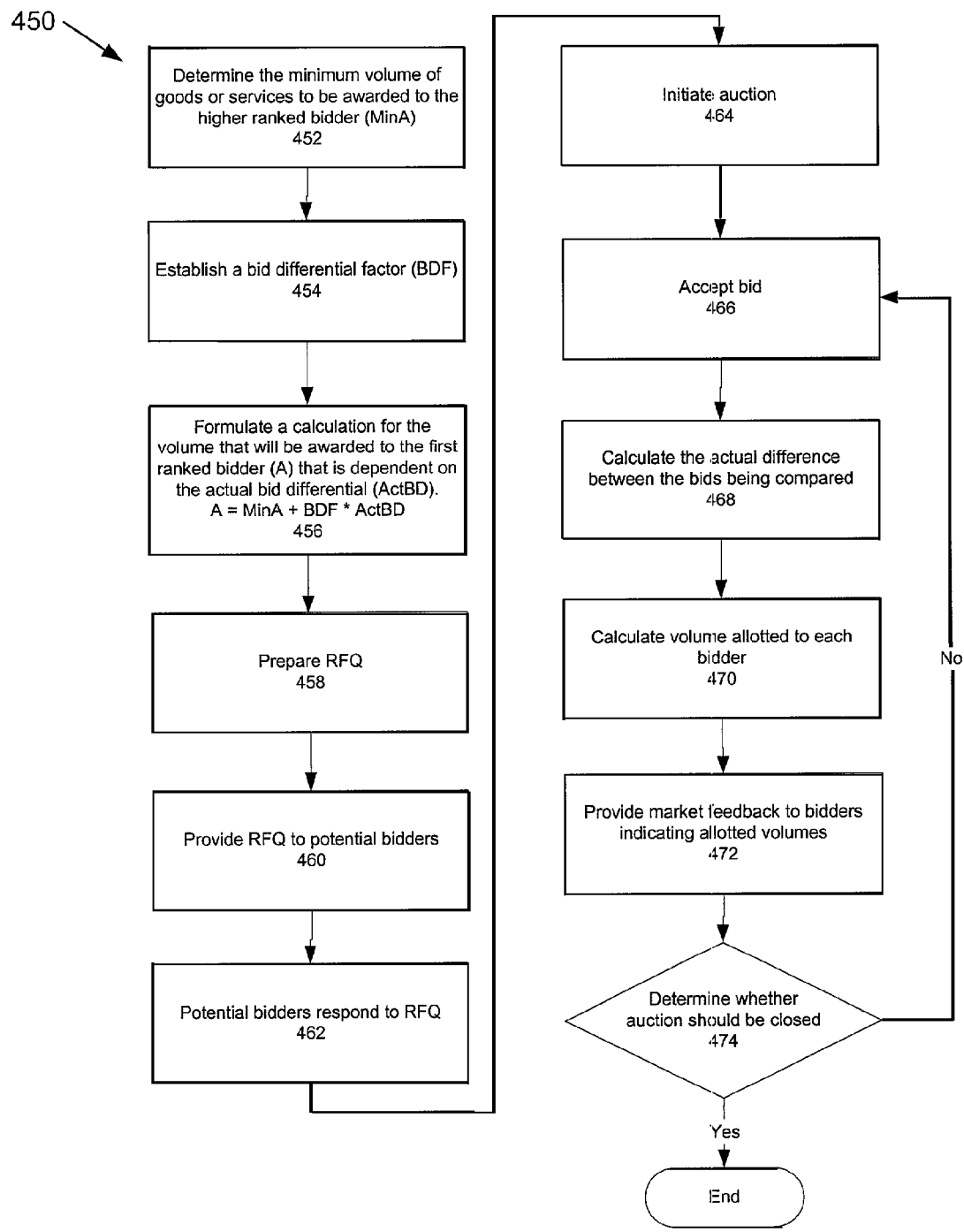
FIG. 8 is a flow diagram illustrating another embodiment of an auction in which multiple contracts are awarded, in accordance with the present invention.

FIG. 8 illustrates another embodiment of the present invention wherein two bidders are to be awarded contracts in a single auction round 450. A minimum volume of goods or services to be awarded to the better ranked bidder being compared is determined at 452. A bid differential factor is established at 454 and a formula is created at 456. An RFQ is prepared at 458 and provided to potential bidders at 460. At 462, the potential bidders respond to the RFQ and auction timing and operational parameters are established. The auction is initiated at 464 and bids are accepted at 466 after the auction assumes its open state. The actual difference between the bids that are being compared is calculated at 468 and the volume allotted to each applicable bidder is calculated at 470. The volume allotted is calculated for the better bidder by use of the equation provided in step 456 with the actual bid differential entered therein. The volume allotted to the other bidder may, for example, be the remaining volume to be awarded or may be calculated by comparing that bidder to yet another bidder by use, for example, of the equation of step 456. Market feedback is provided at 472 and at 474, a determination is made as to whether the auction should be closed. If the auction is to be closed, bidding ends and if the auction is not to be closed, additional bids are accepted at 466.

In an example based on the embodiment illustrated in FIG. 8, the volume to be awarded to the better ranked bidder which, in this example is the first ranked bidder, is equal to a minimum volume plus a factor based on the price differential between the first and second ranked bidder. Thus, the equation utilized in this example is the equation illustrated in step 456 of FIG. 8.

$$A = MinA + BDF * ActBD$$

wherein:

A is the actual percent of total required volume to be awarded to the first ranked bidder;

MinA is the minimum percent of total required volume to be awarded to the first ranked bidder;

BDF is the bid differential factor; and

ActBD is the actual differential between the bids of the first and second ranked bidders in percent.

Of course, the minimum volume would not have to be added to the factor in all equations. Rather, the minimum volume to be awarded could be calculated directly by an award volume formula if so desired. Similarly, the volume may be based on a price differential between any two or more bidders of any rank desired.

In this example, the volume awarded is based on the difference between actual bids of the bidders being compared, which is referred to in FIG. 8 as the "actual bid differential." Those bidders will furthermore be assumed to be the first and second ranked bidders in this example. The bid differential may be a factor of, or a percentage of the bid of either bidder being compared. In the following example, the actual bid differential will be calculated as a percent of the first ranked bid in a reverse auction. Thus at 452, the actual bid differential is calculated as follows:

$$ActBD = (B2 - B1)/B1 * 100\%$$

wherein:

B1 is the bid of the first ranked bidder; and

B2 is the bid of the second ranked bidder.

The bid differential factor in this example is equal to the percent above the minimum volume that is to be awarded to the first ranked bidder for every percent that the first ranked bid is lower than the second ranked bid. Thus, in a scenario wherein, for example, a sponsor 10 wishes to award one additional percent of the total volume to the first ranked bidder for every percent that the first ranked bid is lower than the second ranked bid, the bid differential factor would be equal to one. In the same scenario, if the lowest ranked bidder is to be awarded a minimum of 55% of the total volume, the above equation would appear as:

$$A = 55\% + 1 * ActBD.$$

The bid differential factor of the embodiment illustrated in FIG. 8 may be calculated in many ways. One method of calculating the bid differential is to provide a sponsor with a table of hypothetical differential prices in an auction wherein bids will be in the form of quoted prices. The sponsor may then indicate a volume to be awarded next to each hypothetical differential price, wherein that volume is the volume to be awarded to the first ranked bidder if that differential price occurs in an auction. A formula may then be derived to fit the data points from the table to calculate a ratio of volume to be awarded to differential price. That formula may, for example, be a regression analysis and the bid differential may be equal to a value that is the slope of a straight line through the data points as plotted on a chart, wherein one axis of the chart is volume to be added to the minimum award volume for the first ranked bidder, and the other axis is differential price. The bid differential may alternately be an equation that, for example, describes a curve through such plotted points.

While the invention has been described in detail and with reference to specific embodiments thereof, it will be apparent to one skilled in the art that various changes and modifications can be made therein without departing from the spirit and scope thereof. In particular, it should be noted that while the auction functions described above have been described in the context of downward pricing (reverse) auctions, the auction functions can be equally applied to upward pricing (forward) auctions. Furthermore, it will be understood by one skilled in the art that the present invention may be utilized in embodiments wherein a sponsor 10 wishes to award contracts to three or more bidders 30. Thus, it is intended that the present invention cover the modifications and variations of this invention provided they come within the scope of the appended claims and their equivalents.

What is claimed is:

1. In an electronic auction wherein an award for a given auction round is allocated amongst a plurality of highest ranked bidders including at least a first ranked bidder and a second ranked bidder, a method for providing an incentive to the first ranked bidder and the second ranked bidder to each improve their respective bids during the conducting of the auction, comprising:

(a) adopting a formula for allocating the award amongst at least the first ranked bidder and the second ranked bidder, wherein a factor of the formula is an actual bid differential between a bid of the first ranked bidder and a bid of the second ranked bidder, and wherein application of the formula to bids of the first and second ranked bidders causes a first portion of the award allocated to the first ranked bidder to increase, and a second portion of the award allocated to the second ranked bidder to decrease as a magnitude of the actual bid differential increases;

(b) conducting the electronic auction; and (c) allocating the award between at least the first and second ranked bidders in accordance with the formula and the bids of the first and second ranked bidders.

2. The method of claim 1, wherein step (A) further comprises:

prior to step (B), determining a range of volume to be allocated to the first bidder; and prior to step (B), formulating the formula based on the range of volume to be allocated to the first bidder and a differential bid range.

3. The method of claim 2, wherein a sum of the first and second portions allocated to the first ranked bidder and second ranked bidder, respectively, corresponds to a total volume of the award.

4. The method of claim 1, wherein the plurality of highest ranked bidders includes at least a third ranked bidder, wherein step (C) further comprises:

allocating the award between the first, second and third ranked bidders in accordance with the formula and the best bids of the first, second and third ranked bidders; wherein a sum of the first and second portions allocated to the first ranked bidder and the second ranked bidder, respectively, and a third portion allocated to the third ranked bidder corresponds to a total volume of the award.

5. The method of claim 3 or 4, wherein the total volume is a range of volumes.

6. The method of claim 5, wherein the total volume varies in relation to a bid placed by at least one bidder.

7. The method of claim 5, further comprising applying a factor based on at least one bid received during the auction to a predetermined total volume range to calculate the total volume.

8. The method of claim 1, wherein the first portion to be allocated to the first bidder is a volume of goods.

9. The method of claim 1, wherein the first portion to be allocated to the first bidder is a volume of services.

10. The method of claim 1, further comprising displaying market feedback to at least one bidder during step (B).

11. The method of claim 10, wherein the at least one bidder is a leading bidder.

12. The method of claim 10, further comprising:

allocating volume to at least two bidders during the auction in accordance with the formula; and wherein the market feedback is provided to all bidders, and includes information representing the volume allocated to each of the at least two bidders.

13. The method of claim 10, wherein the market feedback includes a volume allocated to a given bidder in accordance with the formula.

14. The method of claim 13, wherein the volume to be allocated to the given bidder is provided only to the given bidder during the auction.

15. The method of claim 13, wherein the volume to be allocated to the given bidder is provided to a further bidder during the auction.

16. The method of claim 1, wherein said formula further includes:

a range of volume to be allocated to the first ranked bidder equal to a difference between a predetermined minimum volume to be allocated to the first ranked bidder and a predetermined maximum volume to be allocated to the first ranked bidder; a differential bid range that corresponds to a predetermined differential bid amount.

17. The method of claim 16, wherein the predetermined differential bid amount is a maximum amount by which an auction sponsor contemplates that the first ranked bidder may bid better than the second ranked bidder.

18. The method of claim 17, wherein the predetermined differential bid amount is formed by:

establishing a high differential that is equal to a difference between a bid placed by the first ranked bidder and a bid placed by a second bidder that corresponds to an award of the predetermined maximum volume to the first bidder;

establishing a low differential that is equal to a difference between a bid placed by the first bidder and a bid placed by the second bidder that corresponds to an award of the predetermined minimum volume to the first bidder; and subtracting the low differential from the high differential to arrive at the predetermined differential bid amount.

19. The method of claim 1, wherein the formula is determined by:

calculating a bid differential factor by dividing the actual bid differential by a difference between a highest expected bid differential and a lowest expected bid differential;

multiplying the bid differential factor by a difference between a maximum amount to be awarded to a first ranked bidder and a minimum amount to be awarded to the first ranked bidder to arrive at a product; and adding the minimum amount to be awarded to a first ranked bidder to the product.

20. The method of claim 1, wherein the bidders are electronically coupled to an auction coordinator during the conducting of the auction.

21. The method of claim 20, wherein the bidders submit bids to the auction coordinator online during the conducting of the auction.

22. The method of claim 1, wherein the auction is a reverse auction.

23. The method of claim 1, wherein the auction is a forward auction.

24. The method of claim 1, further comprising soliciting potential bidders.

25. The method of claim 24, wherein soliciting potential bidders includes:
preparing a request for quotation;
providing the request for quotation to potential bidders; and
requesting that potential bidders respond to the request for quotation.

26. The method of claim 25, wherein said request for quotation includes an identification of goods to be purchased.

27. The method of claim 25, wherein said request for quotation includes an identification of services to be purchased.

28. The method of claim 1, wherein the first portion to be allocated is expressed in percent.

29. The method of claim 1, wherein the first portion to be allocated is expressed as a quantity.

30. The method of claim 1, further comprising determining a range of volume to be allocated to the first ranked bidder by limiting the range to a capacity of the first ranked bidder.

31. In an electronic auction wherein an award for a given auction round is allocated amongst a plurality of highest ranked bidders including at least a first ranked bidder and a second ranked bidder, a system for providing an incentive to the first ranked bidder and the second ranked bidder to each improve their respective bids during the conducting of the auction, comprising: a sponsor processor; a first bidder processor communicating with said sponsor processor; and a second bidder processor communicating with said sponsor processor; wherein said sponsor processor contains instructions which, when executed by said processor, cause said processor to:

(A) conduct the electronic auction; and
(B) allocate the award between at least the first and second ranked bidders in accordance with a formula and the bids of the first and second ranked bidders; wherein a factor of the formula is an actual bid differential between a bid of the first ranked bidder and a bid of the second ranked bidder, and wherein application of the formula to bids of the first and second ranked bidders causes a first portion of the award allocated to the first ranked bidder to increase and a second portion of the award allocated to the second ranked bidder to decrease as a magnitude of the actual bid differential increases.

32. The system of claim 31, wherein said first bidder processor and said second bidder processor communicate through an auction coordinator.

33. The system of claim 31, wherein said first bidder processor and said second bidder processor communicate through the Internet.

34. A computer readable medium having stored thereon instructions for conducting an electronic auction wherein an award for a given auction round is allocated amongst a plurality of highest ranked bidders including at least a first ranked bidder and a second ranked bidder, the auction having rules that provide an incentive to the first ranked bidder to each improve their respective bids during the conducting of the auction, wherein the instructions, when executed by a processor, cause the processor to:

(A) conduct the electronic auction;
(B) allocate the award between at least the first and second ranked bidders in accordance with a formula and the bids of the first and second ranked bidders; wherein a factor of the formula is an actual bid differential between a bid of the first ranked bidder and a bid of the second ranked bidder, and wherein application of the formula to bids of the first and second ranked bidders causes a first portion of the award allocated to the first ranked bidder to increase and a second portion of the award allocated to the second ranked bidder to decrease as a magnitude of the actual bid differential increases.

35. A bidding device operated by a bidder during an online auction wherein
an award for a given auction round is allocated amongst a plurality of highest ranked bidders including at least a first ranked bidder and a second ranked bidder, the auction having rules that provide an incentive to the first ranked bidder and the second ranked bidder to each improve their respective bids during the conducting of the auction, said bidding device comprising software that enables the bidder to submit bids to a sponsor processor during the auction; wherein the sponsor processor conducts the electronic auction and allocates the award between at least the first and second ranked bidders in accordance with a formula and the bids of the first and second ranked bidders; and wherein a factor of the formula is an actual bid differential between a bid of the first ranked bidder and a bid of the second ranked bidder, and wherein application of the formula to bids of the first and second ranked bidders causes a first portion of the award allocated to the first ranked bidder to increase and a second portion of the award allocated to the second ranked bidder to decrease as a magnitude of the actual bid differential increases.

* * * * *